US012006660B2

(12) United States Patent
Matsumiya et al.

(10) Patent No.: US 12,006,660 B2
(45) Date of Patent: Jun. 11, 2024

(54) VALVE MOUNTING MECHANISM, HYDRAULIC DEVICE, AND WORKING MACHINE

(71) Applicant: KUBOTA CORPORATION, Osaka (JP)

(72) Inventors: Daisuke Matsumiya, Osaka (JP); Masaaki Yoshizumi, Osaka (JP); Toshiki Takada, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 99 days.

(21) Appl. No.: 17/829,681

(22) Filed: Jun. 1, 2022

(65) Prior Publication Data

US 2022/0290409 A1 Sep. 15, 2022

Related U.S. Application Data

(63) Continuation of application No. PCT/JP2020/047666, filed on Dec. 21, 2020.

(30) Foreign Application Priority Data

Dec. 23, 2019 (JP) ................................ 2019-232042

(51) Int. Cl.
*E02F 9/22* (2006.01)
*F15B 15/14* (2006.01)
*F15B 15/20* (2006.01)

(52) U.S. Cl.
CPC .......... *E02F 9/2267* (2013.01); *E02F 9/2271* (2013.01); *F15B 15/14* (2013.01); *F15B 15/202* (2013.01)

(58) Field of Classification Search
CPC ...... F15B 15/202; F15B 15/14; F15B 15/149; E02F 9/2267; E02F 9/2271
See application file for complete search history.

(56) References Cited

U.S. PATENT DOCUMENTS 5,860,233 A * 1/1999 Roubinet .............. E02F 9/2267 37/466
6,427,986 B1 * 8/2002 Sakai ................. B60G 17/0416 188/282.4
2017/0321730 A1 * 11/2017 Kobayashi ................ F16F 9/54

FOREIGN PATENT DOCUMENTS

JP 2001-295810 A 10/2001
JP 2005-42867 A 2/2005
(Continued)

OTHER PUBLICATIONS

International Search Report and Written Opinion of the International Searching Authority issued in International Patent Application No. PCT/JP2020/047666, dated Feb. 16, 2021, along with an English translation thereof.

*Primary Examiner* — Thomas E Lazo
(74) *Attorney, Agent, or Firm* — Greenblum & Bernstein, P.L.C.

(57) ABSTRACT

A valve mounting mechanism, for mounting a mount valve on a cylinder tube of a hydraulic cylinder, includes: an attachment structure that attaches the mount valve to the hydraulic cylinder; a connection structure that connects a second end part of a hydraulic pipe, whose first end part is connected to the hydraulic cylinder, to a cylinder port of the mount valve; and an adjustment mechanism that adjusts relative positions of a pipe fastening portion, where the hydraulic pipe is fastened to the connection structure, and the mount valve.

8 Claims, 17 Drawing Sheets

(56) References Cited

FOREIGN PATENT DOCUMENTS

| | | | |
|---|---|---|---|
| JP | 2014-205954 | A | 10/2014 |
| JP | 2016-94769 | A | 5/2016 |

* cited by examiner

VALVE MOUNTING MECHANISM, HYDRAULIC DEVICE, AND WORKING MACHINE

CROSS REFERENCE TO RELATED APPLICATIONS

This application is a continuation application of International Application No. PCT/JP2020/047666, filed on Dec. 21, 2020, which claims the benefit of priority to Japanese Patent Application No. 2019-232042, filed on Dec. 23, 2019. The entire contents of each of these applications are hereby incorporated herein by reference.

BACKGROUND OF THE INVENTION

1. Field of the Invention

The present invention relates to a valve mounting mechanism that mounts a mount valve on a hydraulic cylinder and to a hydraulic device and a working machine including the valve mounting mechanism.

2. Description of the Related Art

To date, a working machine disclosed in Japanese Unexamined Patent Application Publication No. 2001-295810 is known.

The working machine disclosed in Japanese Unexamined Patent Application Publication No. 2001-295810 includes a hydraulic cylinder that drives a driven member (boom). Hydraulic pipes, through which a hydraulic fluid is supplied to and discharged from the hydraulic cylinder, are connected to the hydraulic cylinder. A hold valve (fall prevention valve), which allows or prohibits passing of a hydraulic fluid discharged from the hydraulic pipe, is attached to the hydraulic cylinder.

SUMMARY OF THE INVENTION

In the working machine disclosed in Japanese Unexamined Patent Application Publication No. 2001-295810, the hold valve has a cylinder port that is connected to the hydraulic pipe. If the hydraulic pipe is not precisely fastened to the cylinder port, an irregular force is applied to a pipe fastening portion where the hydraulic pipe is fastened to the cylinder port, and the risk of fluid leakage increases.

In consideration of the above problem, an object of the present invention is to suppress strain on a pipe fastening portion where a hydraulic pipe, which is connected to a hydraulic cylinder, is fastened to a cylinder port of a mount valve.

A valve mounting mechanism according to an aspect of the present invention, which is a valve mounting mechanism for mounting a mount valve on a cylinder tube of a hydraulic cylinder, includes: an attachment structure that attaches the mount valve to the hydraulic cylinder; a connection structure that connects a second end part of a hydraulic pipe, whose first end part is connected to the hydraulic cylinder, to a cylinder port of the mount valve; and an adjustment mechanism that adjusts relative positions of a pipe fastening portion, where the hydraulic pipe is fastened to the connection structure, and the mount valve.

The connection structure may include, as the adjustment mechanism, a first pipe fitting whose first end part is rotatably fastened to the hydraulic pipe, a second pipe fitting that is disposed at a position where an axial direction of the second pipe fitting is parallel to an axial direction of the first pipe fitting and where the second pipe fitting is offset from the first pipe fitting in a direction perpendicular to the axial directions and that has a first end part connected to the cylinder port, and an intermediate-connection member to which a second end part of the first pipe fitting and a second end part of the second pipe fitting are connected.

The attachment structure may include, as the adjustment mechanism, a clamp member that is attached to the cylinder tube of the hydraulic cylinder so that a position of the clamp member is adjustable in a circumferential direction, an attachment base that is fixed to the clamp member, and an attachment plate to which the mount valve is to be attached. An axis of the first pipe fitting and an axis of the second pipe fitting may extend in a direction parallel to an axis of the cylinder tube. The attachment base may have an attachment surface to which the attachment plate is attached so that a position of the attachment plate is adjustable in an adjustment direction parallel to a direction perpendicular to an axial direction of the first pipe fitting.

The attachment surface may be a surface that is orthogonal to a direction perpendicular to the axis of the cylinder tube. The position of the attachment plate may be adjustable along the attachment surface in the adjustment direction.

The attachment structure may include, as the adjustment mechanism, a clamp member that is attached to the cylinder tube of the hydraulic cylinder so that a position of the clamp member is adjustable in a circumferential direction, a first bracket that is fixed to the clamp member, a second bracket that is attached to a cylinder boss that is fixed to the cylinder tube, and an attachment body that is supported by the first bracket and the second bracket so that a position of the attachment body is adjustable in a direction parallel to a direction perpendicular to an axis of the pipe fastening portion and to which the mount valve is to be attached.

The attachment body may include a plate member to which the mount valve is to be attached, and a first attachment piece and a second attachment piece that are fixed to the plate member. The first attachment piece may be attached to the first bracket so that a position of the first attachment piece is adjustable in two directions parallel to two directions that are perpendicular to the axis of the pipe fastening portion and that are perpendicular to each other. The second attachment piece may be attached to the second bracket so that a position of the second attachment piece is adjustable in one direction of the two directions. The second bracket may be attached to the cylinder boss so that a position of the second bracket is adjustable in the other direction of the two directions.

The attachment structure may include, as the adjustment mechanism, a clamp member that is attached to the cylinder tube of the hydraulic cylinder so that a position of the clamp member is adjustable in a circumferential direction, a pair of block members that are attached to the clamp member, and a holding member that holds the mount valve. The clamp member may include a pair of components that are attached with the cylinder tube interposed therebetween. One of the block members may be attached so as to be interposed between first end parts of the pair of components. The other block member may be attached so as to be interposed between second end parts of the pair of components. The holding member may be provided so as to extend from the one of the block members to the other block member and is attached to the pair of block members so that a position of the holding member is adjustable in a direction parallel to a direction perpendicular to an axial direction of the pipe fastening portion.

The mount valve may be a hold valve that switches between a state in which the hold valve allows passing of a hydraulic fluid discharged from the hydraulic pipe and a state in which the hold valve prohibits passing of a hydraulic fluid discharged from the hydraulic pipe.

A hydraulic device according to an aspect of the present invention includes a hydraulic cylinder and a mount valve that is mounted on a cylinder tube of the hydraulic cylinder by using the valve mounting mechanism.

A working machine according to an aspect of the present invention includes the hydraulic device.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
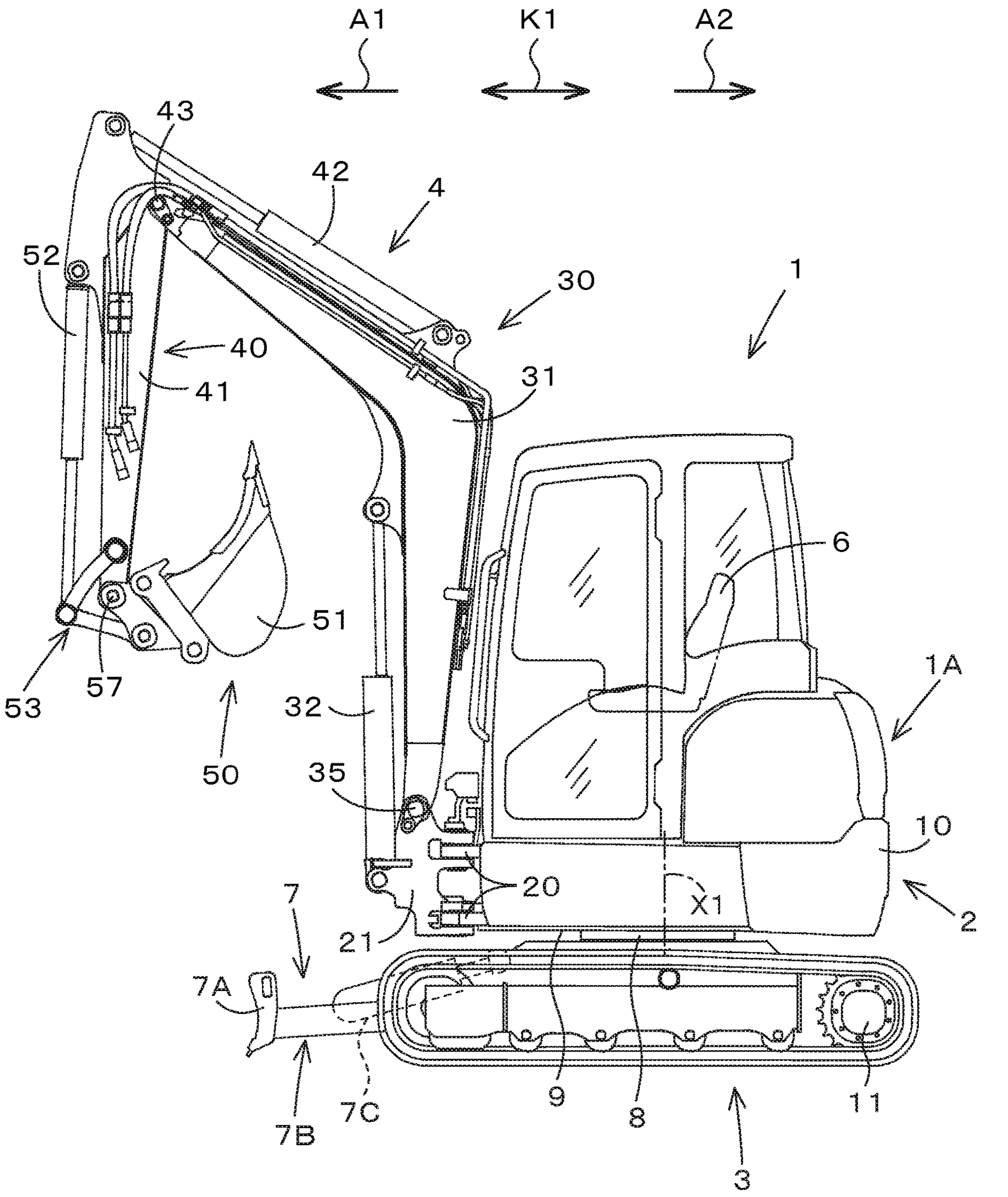
FIG. 1 is a side view of a working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereafter, an embodiment of the present invention will be described with reference to the drawings.

Figure 2:
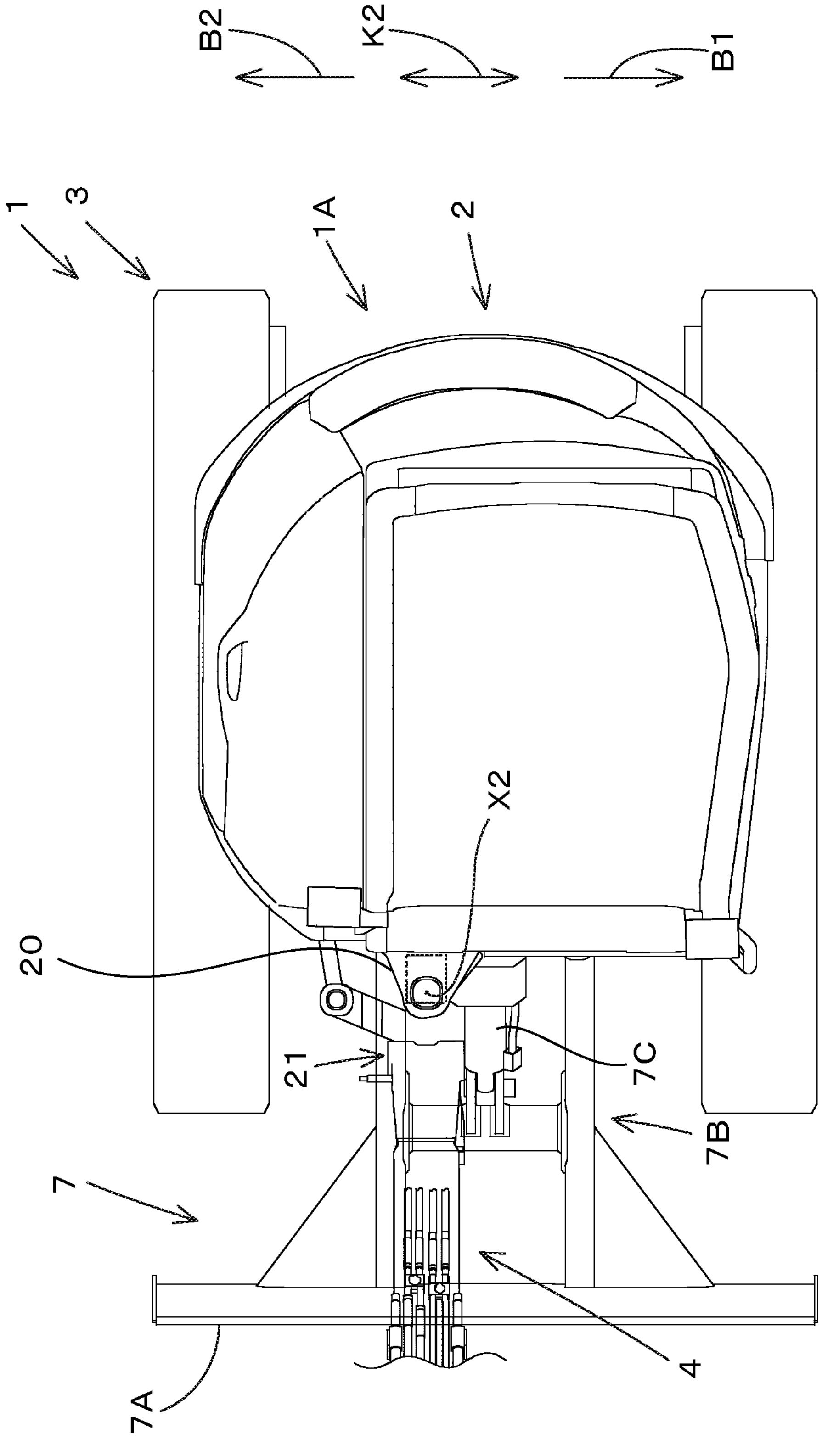
FIG. 2 is a plan view of the working machine.

FIG. 1 is a side view of a working machine 1 according to the present embodiment. FIG. 2 is a schematic plan view of the working machine 1. In the present embodiment, a backhoe, which is a swivel working machine, is described as an example of the working machine 1.

As illustrated in FIG. 1, the working machine 1 includes a traveling body 1A and a working device 4 attached to the traveling body 1A. The traveling body 1A includes a traveling device 3 and a machine body (swivel base) 2 mounted on the traveling device 3. An operator's seat 6, on which an operator sits, is mounted on the machine body 2.

In the present embodiment, a forward direction corresponds a forward direction of an operator sitting on the operator's seat 6 (the direction of an arrow A1 in FIG. 1), a backward direction corresponds to a backward direction of the operator (the direction of an arrow A2 in FIG. 1), a leftward direction corresponds to a leftward direction of the operator (the direction of an arrow B1 in FIG. 2), and a rightward direction corresponds to a rightward direction of the operator (the direction of an arrow B2 in FIG. 2). A machine-body-width direction K2 (the width direction of the machine body 2) corresponds to a horizontal direction perpendicular to the front-back direction K1. A machine-body-outward direction (outward in the machine-body-width direction K2) corresponds to a rightward direction or a leftward direction from a central part of the machine body 2 in the width direction. That is, the machine-body-outward direction is a direction away from the center of the machine body 2 in the machine-body-width direction K2. A machine-body-inward direction (inward in the machine-body-width direction) corresponds to a direction opposite to the machine-body-outward direction. That is, the machine-body-inward direction is a direction toward the center of the machine body 2 in the machine-body-width direction.

As illustrated in FIG. 1, the traveling device 3 is a device that supports the machine body 2 so that the machine body 2 is capable of traveling. The traveling device 3 is driven by a traveling motor 11 including a hydraulic motor (hydraulic actuator), an electric motor, or the like. In the present embodiment, the traveling device 3 of a crawler type is used. However, the type of the traveling device 3 is not limited to this, and a traveling device of a wheel type or the like may be used.

As illustrated in FIGS. 1 and 2, a dozer 7 is mounted on a front part of the traveling device 3. The dozer 7 includes a blade 7A, a dozer arm (driven member) 7B that is fixed to a back part of the blade 7A, and a dozer cylinder (hydraulic cylinder) 7C that raises and lowers the dozer arm 7B. A back part of the dozer arm 7B is pivotably supported by a frame of the traveling device 3 so that the dozer arm 7B can be raised and lowered. The dozer cylinder 7C is provided so as to extend from an intermediate part of the dozer arm 7B to the frame of the traveling device 3, and can raise and lower the dozer arm 7B (the blade 7A) by extending and contracting. To be specific, the dozer arm 7B is raised when the dozer cylinder 7C extends, and the dozer arm 7B is lowered when the dozer cylinder 7C contracts.

The machine body 2 includes a swivel base plate 9 that is included in a bottom part thereof and that is made from a steel plate or the like. The swivel base plate 9 is supported on the traveling device 3 via a swivel bearing 8 so as to be capable of swiveling around a swivel axis X1 extending in the up-down direction. A weight 10 is provided in a back part of the machine body 2. A prime mover is mounted in a back part of the machine body 2. The prime mover is a diesel engine. The prime mover may be a gasoline engine, an electric motor, or a hybrid prime mover including an engine and an electric motor.

The machine body 2 includes, in a front part thereof, a support bracket 20 and a swing bracket 21 that support the working device 4. The support bracket 20 protrudes in the forward direction from the machine body 2. The swing bracket 21 is attached to a front part of the support bracket 20 (a part protruding from the machine body 2) so as to be swingable around a vertical axis (an axis extending in the up-down direction). To be specific, a base part (back part) of the swing bracket 21 is rotatable in a horizontal direction (the machine-body-width direction K2) around a swing axis X2 (see FIG. 2) extending in the up-down direction.

The working device 4 includes a boom device 30, an arm device 40, and a working tool device 50. The boom device 30 includes a boom 31 and a boom cylinder 32. A base part of the boom 31 is swingably (rotatably) supported on an upper part of the swing bracket 21 via a horizontal shaft 35 extending in the machine-body-width direction K2. The boom cylinder 32 includes a hydraulic cylinder that is extendable and contractible, is provided so as to extend from the swing bracket 21 to an intermediate part of the boom 31, and swings the boom 31 by extending and contracting.

The arm device 40 includes an arm 41 and an arm cylinder 42. A base end part of the arm 41 is swingably supported by a distal end part of the boom 31 via a horizontal shaft 43. The arm cylinder 42 includes a hydraulic cylinder that is extendable and contractible, is provided so as to extend from a base part of the arm 41 to an intermediate part of the boom 31, and swings the arm 41 by extending and contracting. The working tool device 50 includes a bucket 51 as a working tool and a bucket cylinder 52 as a working tool cylinder. The bucket 51 is swingably supported by a distal end part of the arm 41 via a pivot shaft 57. The bucket cylinder 52 includes an extendable and contractible hydraulic cylinder, is provided so as to extend from a link mechanism 53, which is provided the bucket 51 and a distal end part of the arm 41, to abase part of the arm 41, and swings the bucket 51 by extending and contracting.

Figure 3:
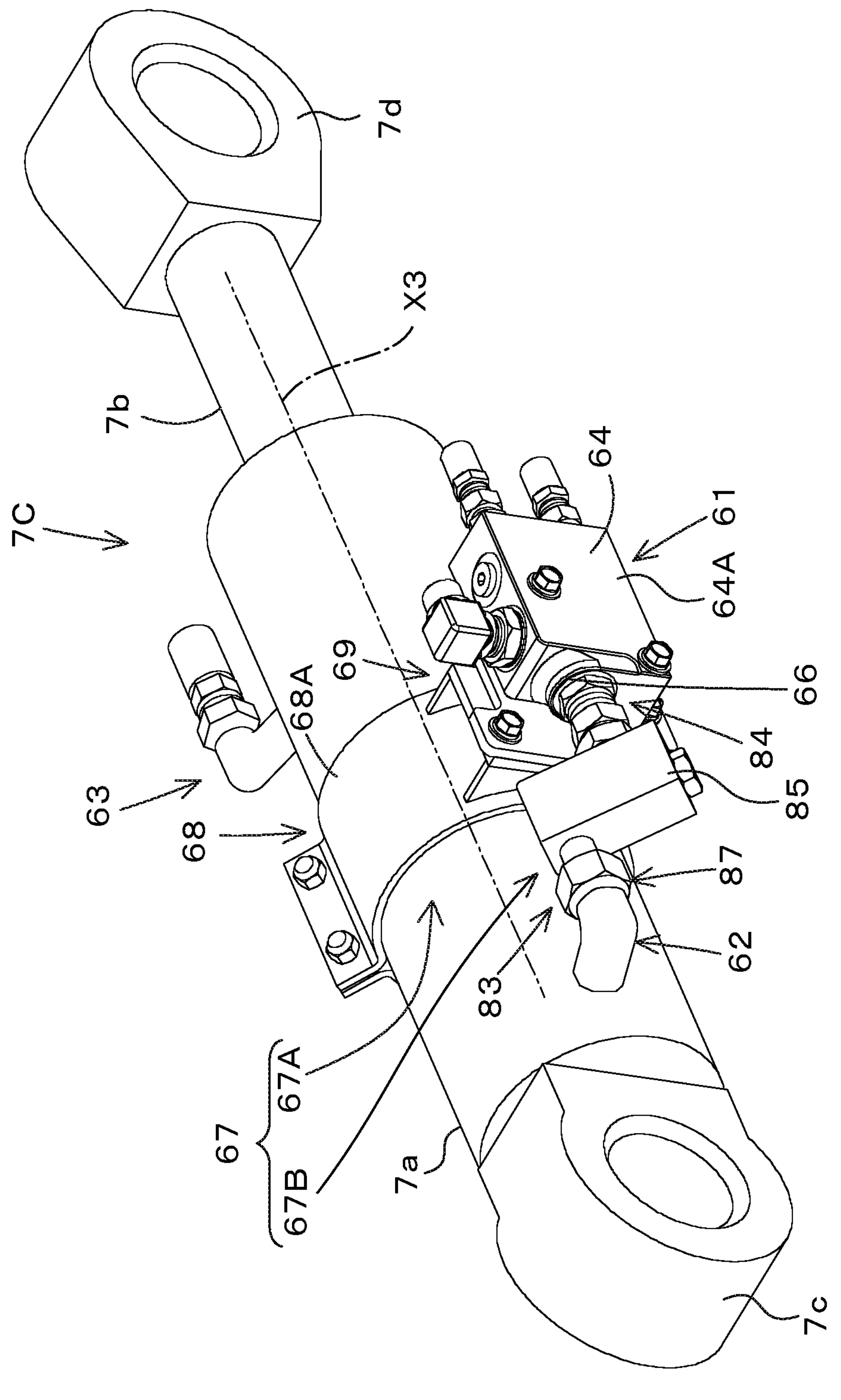
FIG. 3 is a perspective view of a dozer cylinder and a hold valve.

FIG. 3 is a perspective view illustrating a state in which a hold valve device 61 is mounted on the dozer cylinder 7C.

As illustrated in FIG. 3, the dozer cylinder 7C includes a cylinder tube 7*a* having a tubular shape and a piston rod 7*b* whose one end part is slidably inserted into the cylinder tube 7*a*. A bottom coupler 7*c*, which is to be pivotably coupled to the dozer arm 7B, is provided on the bottom side of the cylinder tube 7*a* (a side from which the piston rod 7*b* does not protrude). A rod coupler 7*d*, which is to be pivotably coupled to the frame of the traveling device 3, is provided on a distal end part of the cylinder tube 7*a*. A first cylinder pipe (hydraulic pipe) 62, through which a hydraulic fluid is supplied to and discharged from the dozer cylinder 7C, is connected to the bottom side of the cylinder tube 7*a*. A second cylinder pipe (hydraulic pipe) 63, through which a hydraulic fluid is supplied to and discharged from the dozer cylinder 7C, is connected to the rod side of the cylinder tube 7*a* (a side from which the piston rod 7*b* protrudes). The first cylinder pipe 62 communicates with a bottom-side fluid chamber of the cylinder tube 7*a*, and the second cylinder pipe communicates with a rod-side fluid chamber of the cylinder tube 7*a*. The bottom-side fluid chamber and the rod-side fluid chamber are partitioned by a piston that is accommodated in the cylinder tube 7*a* so as to be movable in a direction along the axis (the axial direction) of the cylinder tube 7*a*.

When a hydraulic fluid is supplied from the first cylinder pipe 62 to the bottom-side fluid chamber, the dozer cylinder 7C extends and a hydraulic fluid is discharged from the second cylinder pipe 63. When a hydraulic fluid is supplied from the second cylinder pipe 63 to the rod-side fluid chamber, the dozer cylinder 7C contracts and a hydraulic fluid is discharged the first cylinder pipe 62. In the present embodiment, the first cylinder pipe 62 is fixed to a front part of a side surface (left side surface) the cylinder tube 7*a*.

As illustrated in FIG. 3, the hold valve device 61 includes a hold valve (mount valve) 64. The hold valve 64 is a valve that allows or prohibits flow of a hydraulic fluid discharged from the first cylinder pipe 62. To be specific, the hold valve 64 is provided in a hydraulic pipe passage between a dozer control valve, which switches the direction of a hydraulic fluid with respect to the dozer cylinder 7C, and the first cylinder pipe 62. If a pipe passage between the hold valve 64 and the dozer control valve breaks and the hydraulic fluid leaks, the hold valve 64 blocks the pipe passage to stop discharging of the hydraulic fluid from the first cylinder pipe 62.

Figure 4:
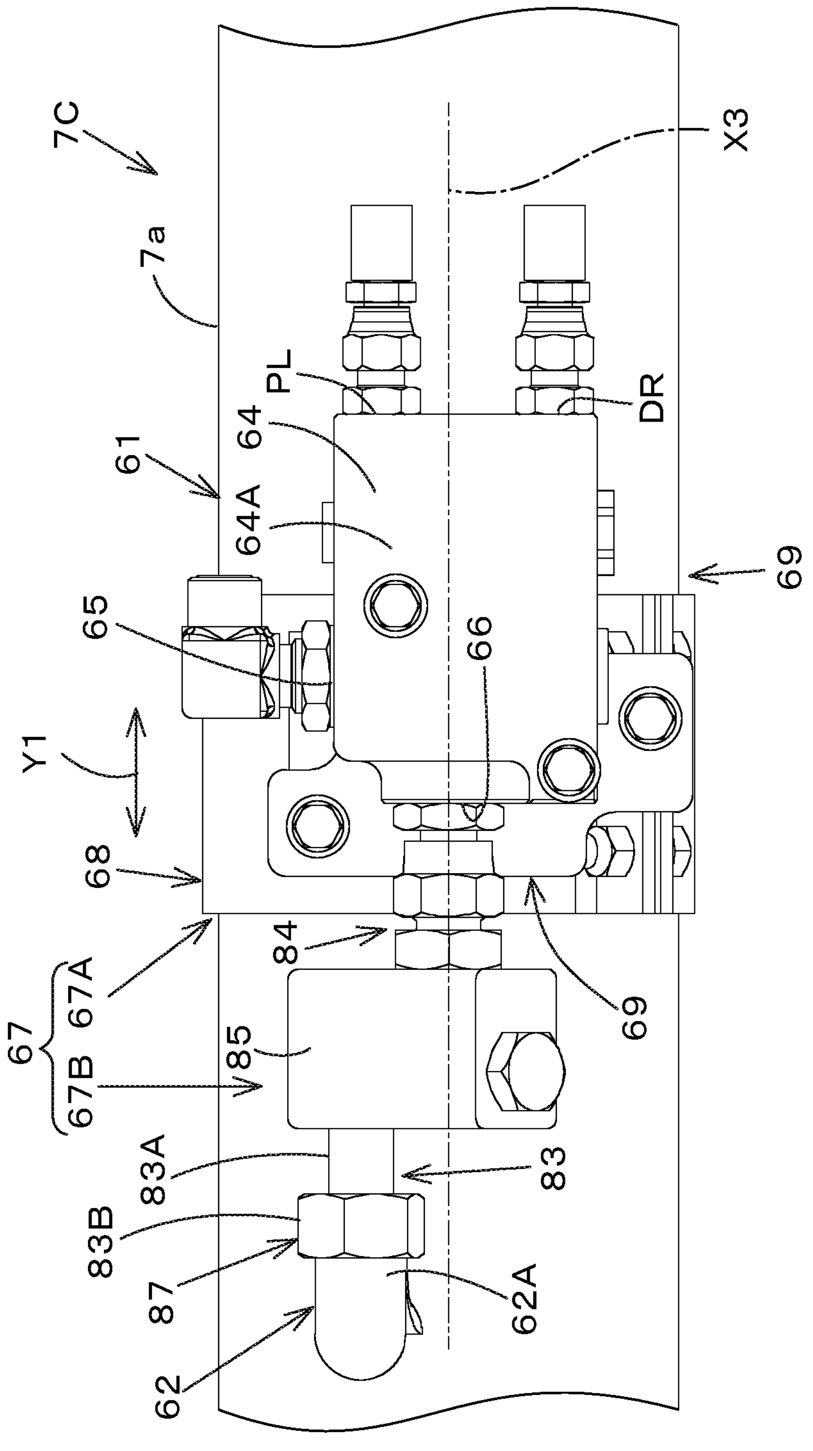
FIG. 4 is a side view illustrating a state in which the hold valve is attached to a hydraulic cylinder.

As illustrated in FIGS. 3 and 4, the hold valve 64 is disposed on a side (the left side) of the cylinder tube 7*a* and behind the first cylinder pipe 62. The hold valve 64 includes a valve body 64A having a rectangular block-like shape (rectangular-parallelepiped shape). The valve body 64A is disposed so that one end surface thereof in the thickness direction faces a side surface (left side surface) of the cylinder tube 7*a*. A drain port DR and a pilot port PL are formed in a back surface of the valve body 64A, an inlet port 65 is formed in a front part of an upper surface of the valve body 64A, and a cylinder port 66 is formed in a front surface of the valve body 64A.

The drain port DR communicates with a hydraulic fluid tank that stores a hydraulic fluid. That is, the drain port DR is a port through which a hydraulic fluid is returned to the hydraulic fluid tank. The pilot port PL is a port through which a pilot signal pressure is introduced. To be specific, a pilot signal pressure when a pilot valve that pilot-operates the dozer control valve is operated is introduced to the pilot port PL. A hydraulic fluid that has been output from the hydraulic pump and passed through the dozer control valve is introduced to the inlet port 65. The cylinder port 66 communicates with the first cylinder pipe 62, and allows a hydraulic fluid to flow therethrough so as to supply the hydraulic fluid to the first cylinder pipe 62. When a hydraulic fluid is discharged from the first cylinder pipe 62, the discharged hydraulic fluid flows into the cylinder port 66.

A shut-off valve and a switching valve are provided in the valve body 64A. When a pilot signal pressure is introduced from the pilot port PL, the switching valve is switched to one position to cause the shut-off valve to be in a pass-allowing state in which a hydraulic fluid can pass therethrough. When the shut-off valve is in the pass-allowing state, a hydraulic fluid introduced to the inlet port 65 can be supplied from the cylinder port 66 to the first cylinder pipe 62, and, when a hydraulic fluid is discharged the first cylinder pipe 62, the hydraulic fluid can flow from the cylinder port 66 to the drain port DR. When the pilot signal pressure is not introduced to the pilot port PL, the switching valve is switched to the other position to cause the shut-off valve to be in a shut-off state in which a hydraulic fluid cannot flow therethrough. Then, a hydraulic fluid discharged from the first cylinder pipe 62 does not flow from the cylinder port 66 to the drain port DR.

As illustrated in FIG. 3, the hold valve device 61 includes an adjustment mechanism 67. The adjustment mechanism

67 adjusts the positions of a pipe fastening portion 87, where the first cylinder pipe 62 is fastened to the cylinder port 66, and the hold valve 64. The adjustment mechanism 67 includes an attachment structure 67A that attaches the hold valve 64 to the cylinder tube 7*a* (the dozer cylinder 7C), and a connection structure 67B that connects the cylinder port 66 and the first cylinder pipe 62. In other words, the hold valve device 61 includes a valve mounting mechanism that mounts the hold valve (mount valve) 64 on the cylinder tube 7*a* of the dozer cylinder 7C (hydraulic cylinder); and the valve mounting mechanism includes the attachment structure 67A, the connection structure 67B, and the adjustment mechanism 67. The dozer cylinder 7C (hydraulic cylinder) and the hold valve (mount valve) 64, which is mounted on the cylinder tube 7*a* of the dozer cylinder 7C by using the valve mounting mechanism, are included in a hydraulic device.

Figure 6:
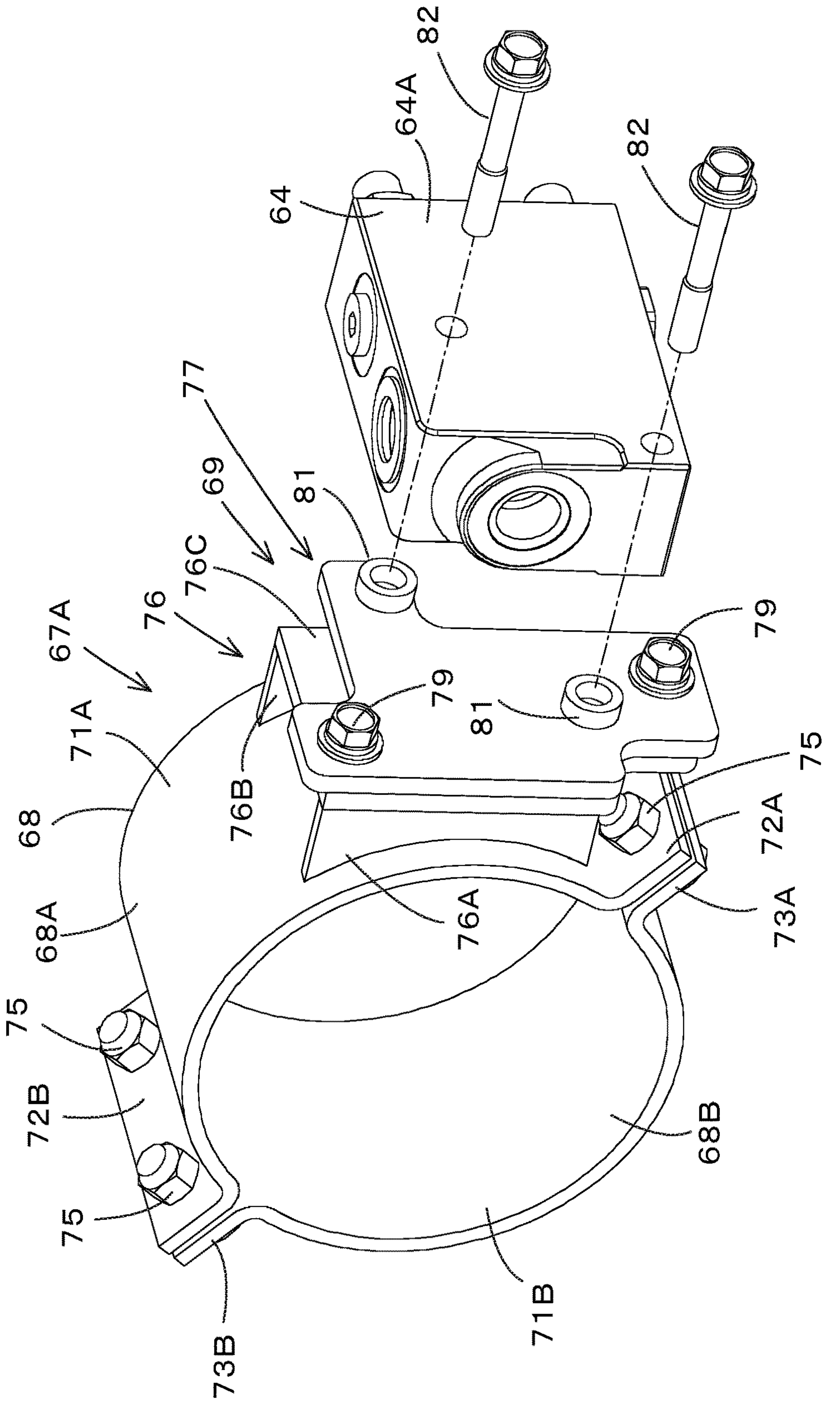
FIG. 6 is a perspective view of an attachment structure and the hold valve.
Figure 7:
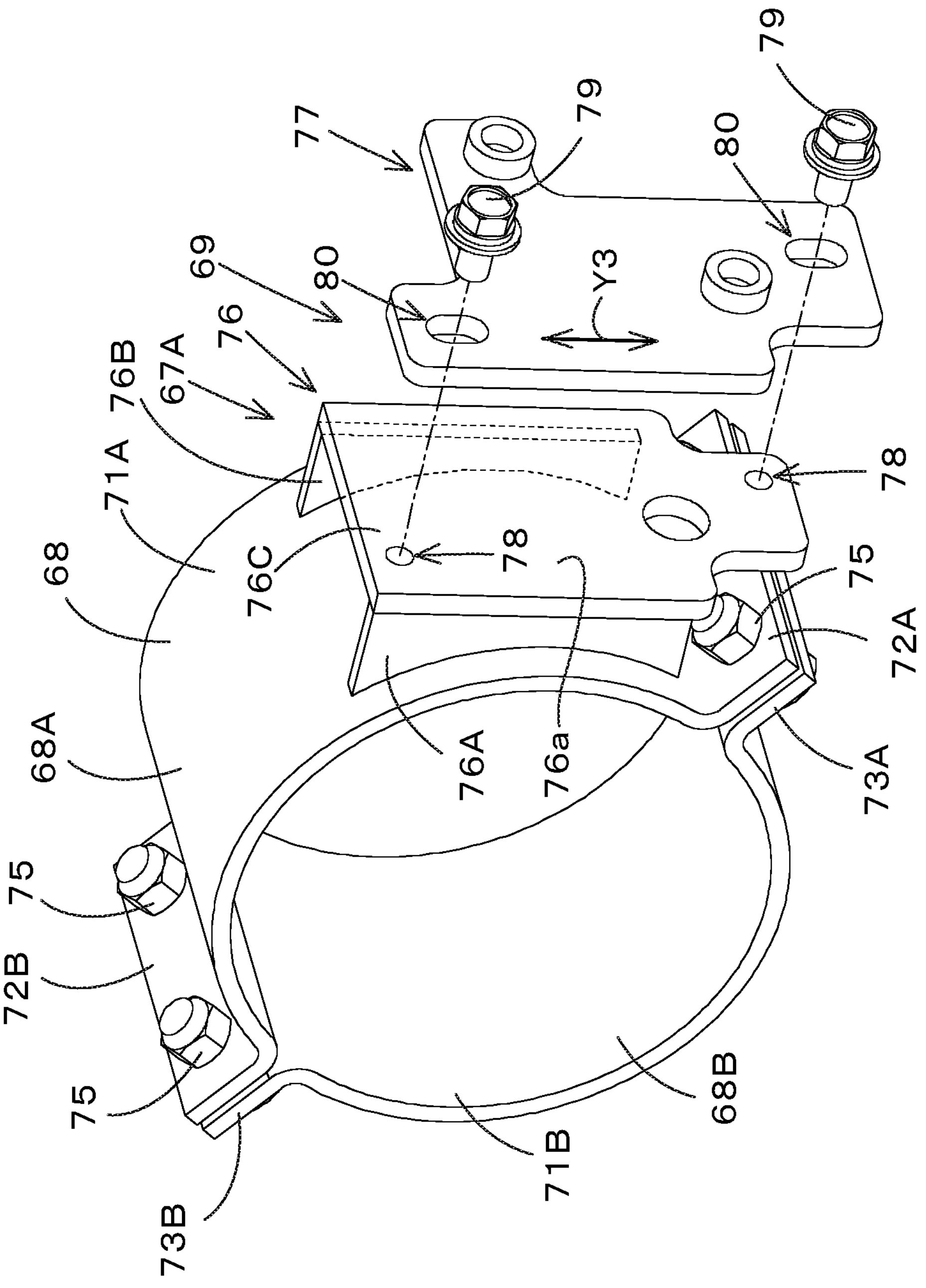
FIG. 7 is an exploded perspective view of the attachment structure.

As illustrated in FIGS. 6 and 7, the attachment structure 67A includes a clamp member 68 and an attachment body 69. The clamp member 68 includes a pair of components (a first component 68A and a second component 68B). The first component 68A includes a curved (semicylindrical) fitting portion 71A that fits to the cylinder tube 7*a* from the outside in the radial direction, and a pair of fixing pieces 72A and 72B that extend in the radial direction from both ends in the circumferential direction of the fitting portion 71A. Likewise, the second component 68B includes a fitting portion 71B and a pair of fixing pieces 73A and 73B.

Figure 5:
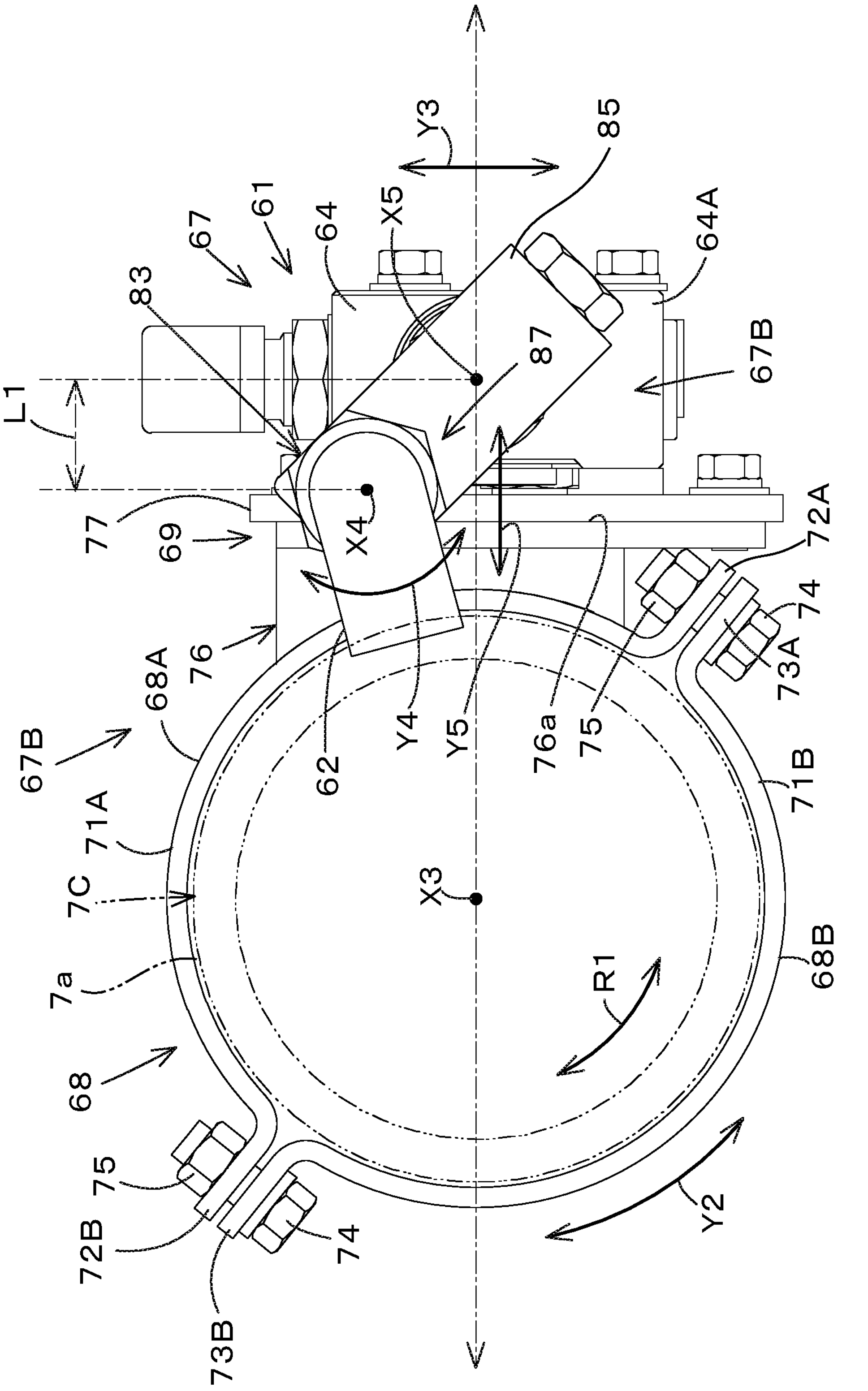
FIG. 5 is a front view illustrating a state in which the hold valve is attached to the hydraulic cylinder.

As illustrated in FIG. 5, when the first component 68A and the second component 68B are disposed with the cylinder tube 7*a* interposed therebetween, the fixing pieces 72A and 72B of the first component 68A and the fixing pieces 73A and 73B of the second component 68B face each other. Then, the clamp member 68 is attached to the cylinder tube 7*a* by fastening the facing fixing pieces to each other (the fixing piece 72A and the fixing piece 73A to each other, and the fixing piece 72B and the fixing piece 73B to each other) by using bolts 74 and nuts 75. Accordingly, by loosening the bolts 74 and the nuts 75, the position of the clamp member 68 is adjustable in a first direction (the arrow Y1 direction in FIG. 4) along the axis X3 direction of the cylinder tube 7*a* and a second direction (the arrow Y2 direction in FIG. 5) along the circumferential direction R1 of the cylinder tube 7*a*.

As illustrated in FIG. 5, the attachment body 69 is provided between the clamp member 68 and the hold valve 64. The attachment body 69 includes an attachment base 76 and an attachment plate 77.

As illustrated in FIGS. 6 and 7, the attachment base 76 includes a pair of fixing members 76A and 76B that are welded to the clamp member 68 (one of the components) and a base plate 76C that is welded to the pair of fixing members 76A and 76B. The fixing member 76A and the fixing member 76B are disposed so as to be spaced apart in the longitudinal direction of the cylinder tube 7*a*. Apart of each of the fixing member 76A and the fixing member 76B on a side fixed to the cylinder tube 7*a* has a curved shape that coincides with the curved shape of the fitting portion of the clamp member 68. The attachment plate 77 is disposed on a side of the fixing member 76A and the fixing member 76B opposite to the cylinder tube 7*a*, is provided so as to extend from the fixing member 76A to the fixing member 76B, and is welded to the pair of fixing members 76A and 76B. A plurality of (in the present embodiment, two) screw holes 78 are formed in the base plate 76C. The screw holes 78 each have a female thread in an inner periphery thereof. The screw holes 78 are formed in an upper part and a lower part of the attachment plate 77.

As illustrated in FIGS. 6 and 7, the attachment plate 77 is superposed on a surface (an attachment surface 76*a*) of the base plate 76C opposite to the cylinder tube 7*a*, and is attached to the base plate 76C (the attachment surface 76*a*) by using attachment bolts 79. Bolt insertion holes 80, through which the attachment bolts 79 are inserted, are formed in the attachment plate 77. The bolt insertion holes 80 are elongated holes that are elongated in a direction (third direction Y3) parallel to a direction perpendicular to the axis X4 of a first pipe fitting 83 described below. The attachment plate 77 is attached the base plate 76C by inserting the attachment bolts 79 through the bolt insertion holes 80 and screwing the attachment bolts 79 into the screw holes 78. The position of the attachment plate 77 is adjustable with respect to the base plate 76C within the range of the elongated holes of the bolt insertion holes 80.

As illustrated in FIG. 6, a plurality of (in the present embodiment, two) nut portions 81 are provided on the attachment plate 77. The hold valve 64 is attached to the attachment plate 77 by using attachment bolts 82 that extend through the valve body 64A and are screwed into the nut portions 81.

As illustrated in FIGS. 3 and 4, the connection structure 67B includes the first pipe fitting 83, a second pipe fitting 84, and an intermediate-connection member 85. A first end part of the first pipe fitting 83 is rotatably connected to the first cylinder pipe 62. A second end part of the first pipe fitting 83 is connected to the intermediate-connection member 85. A first end part of the second pipe fitting 84 is connected to the cylinder port 66. A second end part of the second pipe fitting 84 is connected to the intermediate-connection member 85.

Figure 8:
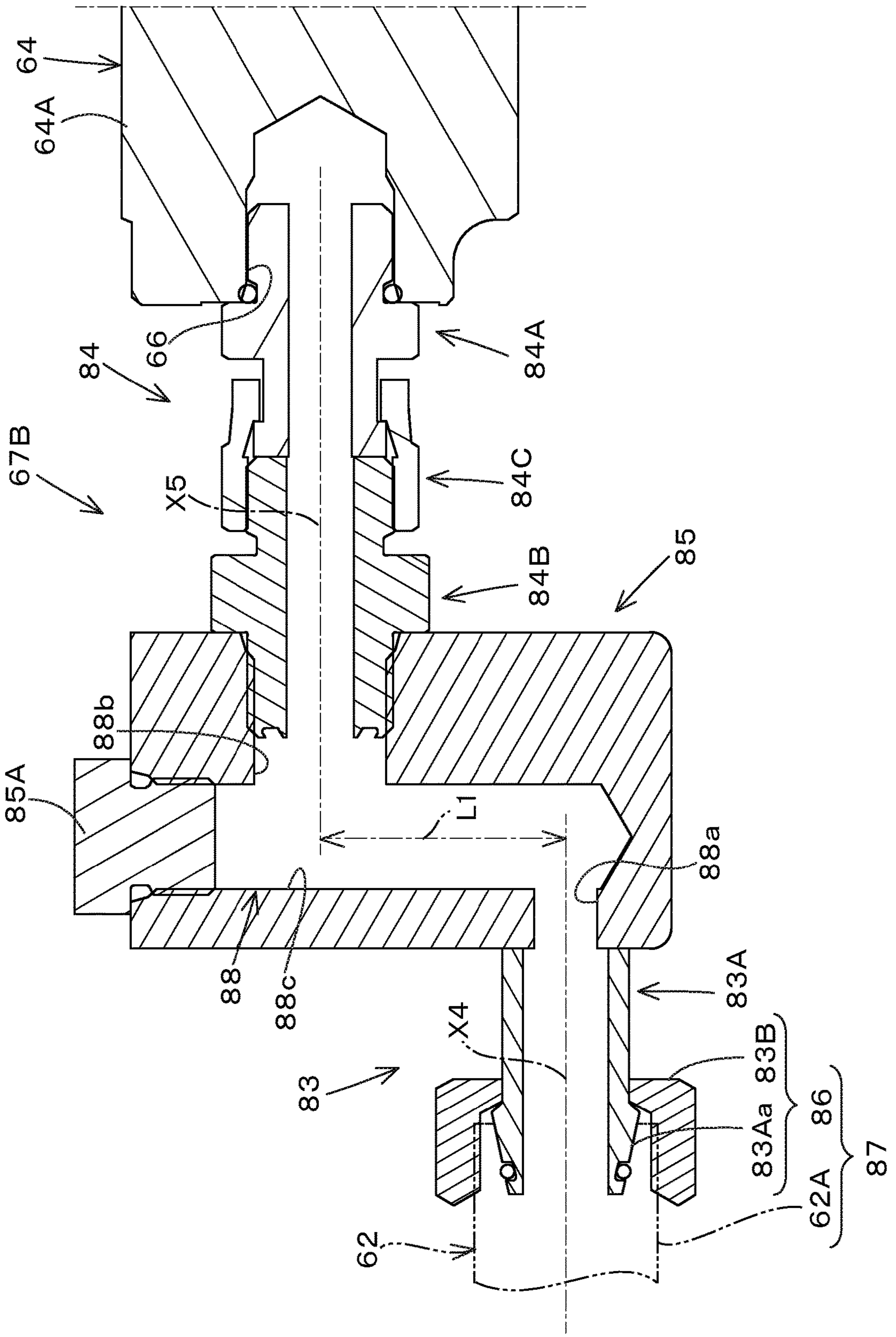
FIG. 8 is a sectional view of a connection structure.

As illustrated in FIG. 8, the first pipe fitting 83 includes a connection pipe 83A and an adapter nut 83B. One end of the connection pipe 83A is fixed to the intermediate-connection member 85. The connection pipe 83A includes, at the other end thereof, a connection portion 83Aa that is taper-fitted into a connection portion (first joint portion) 62A of the first cylinder pipe 62. The adapter nut 83B is screw-fitted onto the first joint portion 62A. The connection portion 83Aa and the adapter nut 83B are included in a second joint portion 86 that is fastened to the first joint portion 62A. The first joint portion 62A and the second joint portion 86 are included in the pipe fastening portion 87 where the first cylinder pipe 62 (hydraulic pipe) is fastened to the cylinder port 66. The first joint portion 62A, the second joint portion 86 (the first pipe fitting 83), and the pipe fastening portion 87 have the same axis X4.

The second pipe fitting 84 includes a first adapter 84A that is connected to the cylinder port 66, a second adapter 84B that is connected to the intermediate-connection member 85, and a coupling 84C that joins the first adapter 84A and the second adapter 84B.

The intermediate-connection member 85 is a rectangular-block-shaped member in which a connection fluid passage 88 that connects the first pipe fitting 83 and the second pipe fitting 84 is formed. The connection fluid passage 88 includes a first fluid passage 88*a* whose axis is the same as the axis X4 of the first pipe fitting 83, a second fluid passage 88*b* whose axis is the same as the axis X5 of the second pipe fitting 84, a third fluid passage 88*c* that is formed in a direction perpendicular to the axes X4 and X5 and that connects the first fluid passage 88*a* and the second fluid passage 88*b*. The third fluid passage 88*c* is formed from one end part of the intermediate-connection member 85 and is blocked by a plug 85A.

As illustrated in FIG. 5, the axis X4 of the first pipe fitting 83 and the axis X5 of the second pipe fitting 84 extend parallel to the axis X3 of the cylinder tube 7*a*. As illustrated in FIGS. 5 and 8, the axis X4 of the first pipe fitting 83 and the axis X5 of the second pipe fitting 84 are offset from each other (so as to be parallel to each other) by a predetermined distance in a direction perpendicular to these axial directions.

As illustrated in FIG. 5, in the present embodiment, the attachment surface 76*a* is a surface that is parallel to (orthogonal to a direction perpendicular to) the axis X3 of the cylinder tube 7*a*. The bolt insertion holes 80 are elongated holes that are elongated in a direction (third direction Y3) that is along the attachment surface 76*a* and that is parallel to a direction perpendicular to the axis X4 of the first pipe fitting 83. Accordingly, the position of the attachment plate 77 is adjustable along the attachment surface 76*a* in the third direction (adjustment direction) Y3 that is parallel to the direction perpendicular to the axial direction of the first pipe fitting 83.

As illustrated in FIG. 5, with the structure of the connection structure 67B, the axis-to-axis distance L1 between the first pipe fitting 83 and the second pipe fitting 84 increases and decreases when the first pipe fitting 83 rotates in a fourth direction Y4 around the axis thereof. Thus, it is possible to adjust the position of the hold valve 64 in a fifth direction Y5 that is a direction in which the hold valve 64 moves closer to and away from the cylinder tube 7*a*. Moreover, by connecting the first cylinder pipe 62 and the cylinder port 66 via the first pipe fitting 83, the second pipe fitting 84, and the intermediate-connection member 85, even when the axis-to-axis distance L1 between the first pipe fitting 83 and the second pipe fitting 84 is small, it is possible to easily configure a piping structure between the cylinder port 66 and the first cylinder pipe 62.

As heretofore described, with the adjustment mechanism 67, the position of the hold valve 64 is adjustable with respect to the pipe fastening portion 87 in the first direction Y1, the second direction Y2, the third direction Y3, and the fifth direction Y5. To be specific, it is possible to adjust the position of the hold valve 64 in the first direction Y1 by sliding the clamp member 68 in the axial direction of the cylinder tube 7*a*. It is possible to adjust the position of the hold valve 64 in the second direction Y2 by rotating the clamp member 68 in the circumferential direction R1 of the cylinder tube 7*a*. It is possible to adjust the position of the hold valve 64 in the third direction Y3 by sliding the attachment plate 77 in the third direction Y3 with respect to the base plate 76C. It is possible to adjust the position of the hold valve 64 in the fifth direction by rotating the connection structure 67B in the fourth direction Y4.

By performing these adjustments, it is possible to suppress occurrence of strain on the pipe fastening portion 87 and to reduce the risk of fluid leakage.

Figure 9:
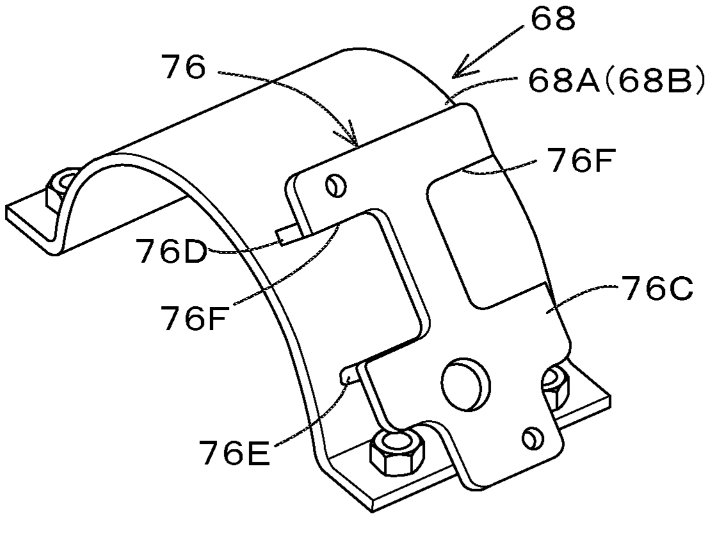
FIG. 9 is a perspective view of an attachment base according to a modification.
Figure 10:
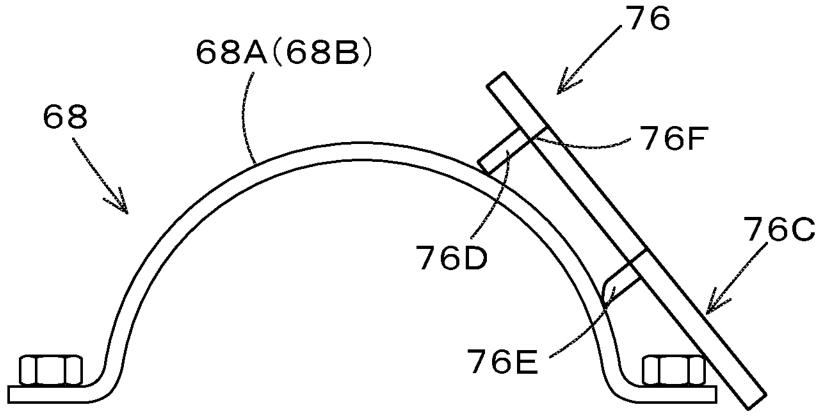
FIG. 10 is a front view of the attachment base according to the modification.

FIGS. 9 and 10 illustrate the attachment base 76 according to a modification. In the attachment base 76 according to the modification, a fixing member 76D and a fixing member 76E are disposed so as to extend in a direction along the axial direction of the clamp member 68 (the axial direction of the cylinder tube 7*a*), are disposed so as to be spaced apart in the circumferential direction of the clamp member 68 (the circumferential direction R1 of the cylinder tube 7*a*), and are welded to the clamp member 68. Cutout portions 76F are formed in the base plate 76C by cutting out parts of the base plate 76C between the fixing member 76D and the fixing member 76E. Thus, it is possible to reduce an assembly stress due to decrease of the rigidity of the clamp member 68.

Figure 11:
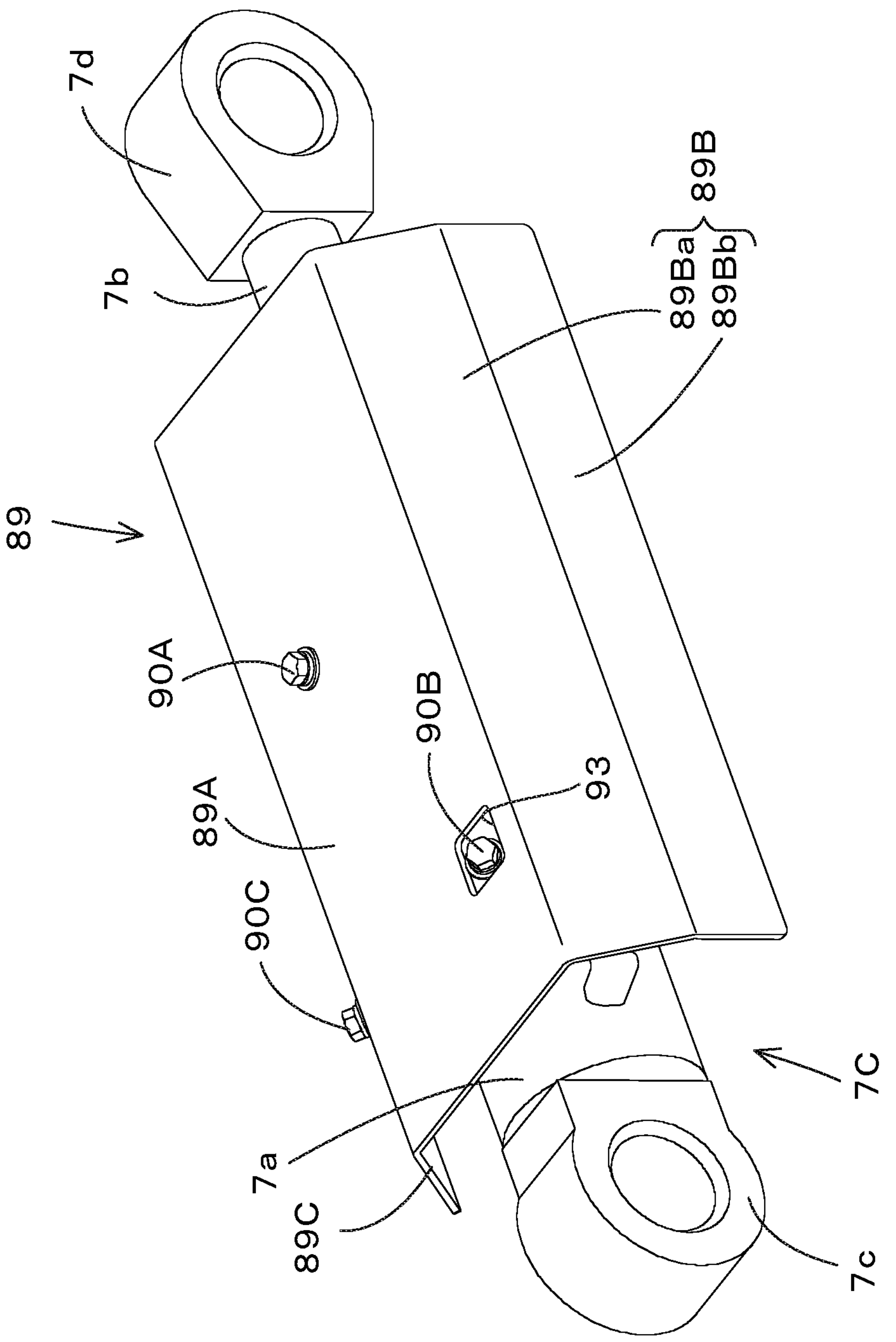
FIG. 11 is a perspective view illustrating a state in which a cover member is mounted on the hydraulic cylinder.
Figure 12:
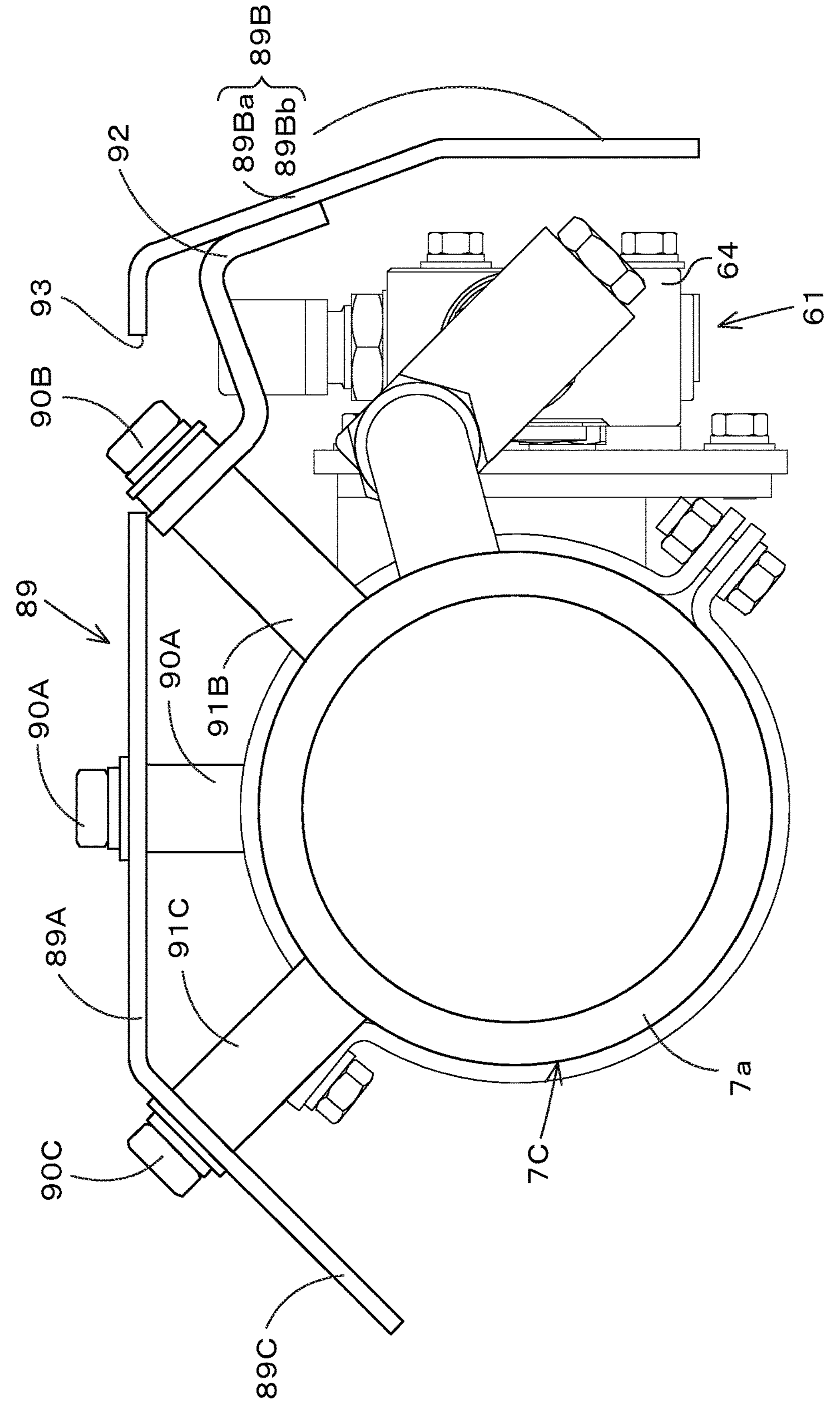
FIG. 12 is a sectional view illustrating the state in which the cover member is mounted on the hydraulic cylinder.

FIGS. 11 and 12 illustrate an example in which a cover member 89, which covers the hold valve device 61 and the cylinder tube 7*a*, is provided in the dozer cylinder 7C.

The cover member 89 includes an upper wall portion 89A that covers the upper side of the cylinder tube 7*a*, a first side-wall portion 89B that is disposed on one side (the left side) of the cylinder tube 7*a* and covers the one side of the hold valve 64, and a second side-wall portion 89C that covers the other side of the cylinder tube 7*a*. A first boss 91A to which the upper wall portion 89A is attached by using a bolt 90A, a second boss 91B to which the first side-wall portion 89B is attached by using a bolt 90B, and a third boss 91C to which the second side-wall portion 89C is attached by using a bolt 90C are fixed to the cylinder tube 7*a*.

The first side-wall portion 89B includes a first section 89Ba on the upper side thereof and a second section 89Bb on the lower side thereof. The first section 89Ba is inclined in a direction such that the distance between a part of the first section 89Ba and the cylinder tube 7*a* increases as the part shifts downward from an end, in the machine-body-width direction K2, of the upper wall portion 89A. The second section 89Bb extends downward from a lower end of the first section 89Ba while maintaining a predetermined distance from the hold valve 64. A stay member 92 is fixed to the inside of the first section 89Ba, and the stay member 92 is attached to the second boss 91B. An open hole 93, for performing an operation of fastening the bolt 90B to attach the stay member 92 to the second boss 91B, is formed in the upper wall portion 89A. The stay member 92 is fixed also to the inside of the upper wall portion 89A. The second side-wall portion 89C is inclined in a direction such the distance between a part of second side-wall portion 89C and the cylinder tube 7*a* increases as the part shifts downward from an end, in the machine-body-width direction K2, of the upper wall portion 89A.

Figure 13:
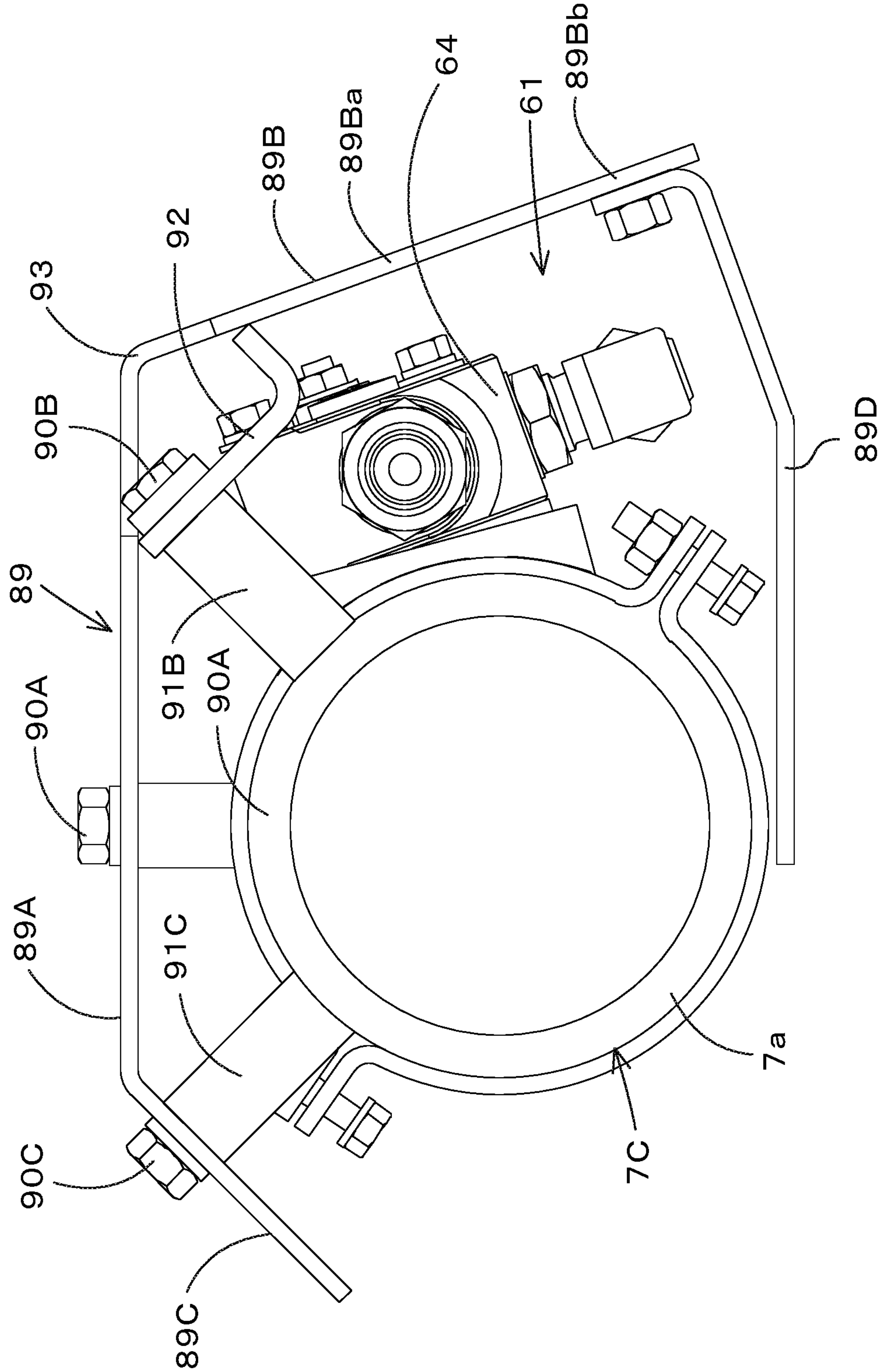
FIG. 13 is a sectional view illustrating another configuration of the cover member.

FIG. 13 is a sectional view illustrating another configuration of the cover member 89.

As illustrated in FIG. 13, the first side-wall portion 89B of the cover member 89 is formed in such a shape that the second section 89Bb is extended in the inclination direction of the first section 89Ba. The hold valve 64 is attached along the inclination of the first side-wall portion 89B. The open hole 93 is formed from the upper wall portion 89A to an upper part of the first side-wall portion 89B. The cover member 89 includes a lower plate 89D that protrudes from a lower part of the second section 89Bb toward a position below the cylinder tube 7*a* and that covers the cylinder tube 7*a* and the hold valve device 61 from below.

Figure 14:
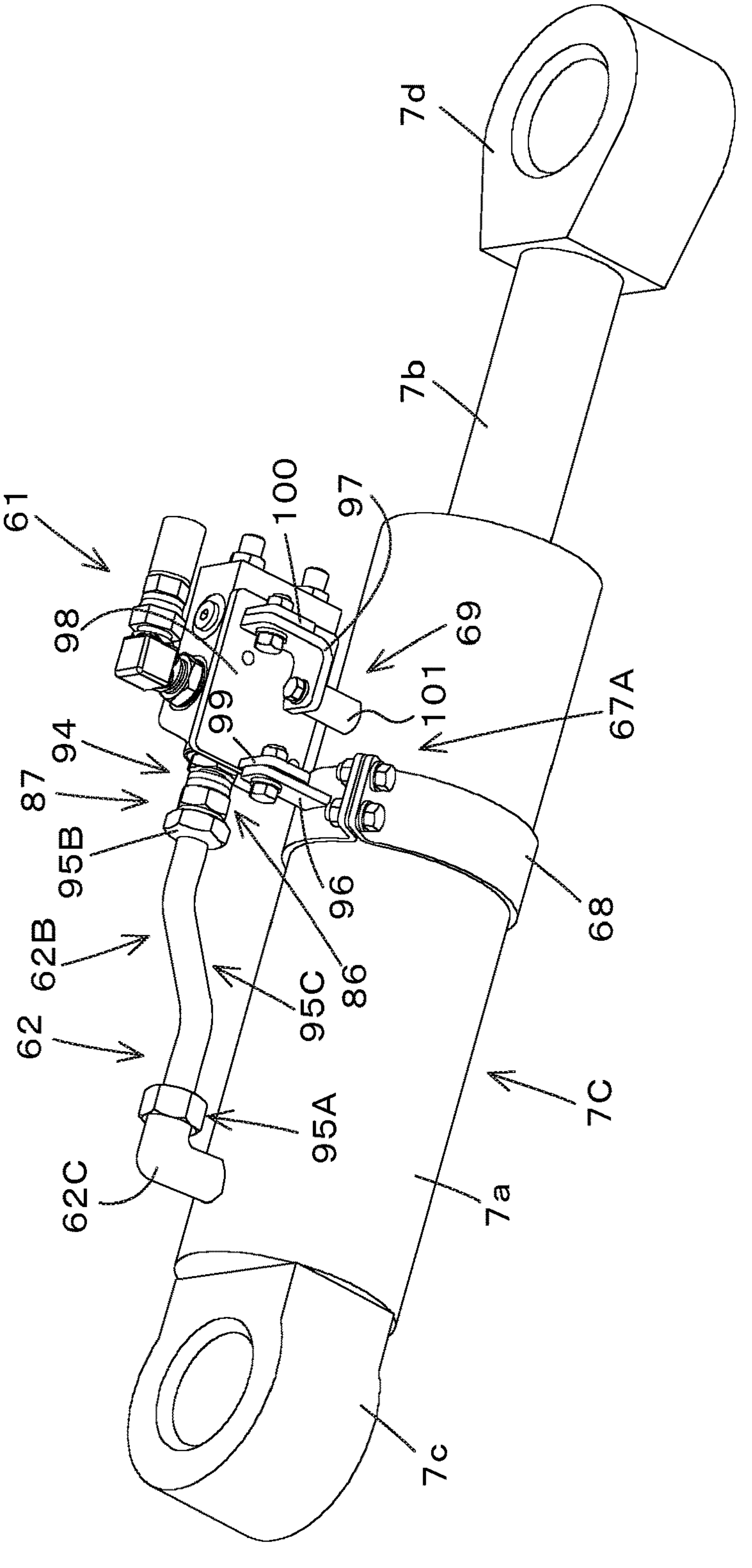
FIG. 14 is a perspective view of an adjustment mechanism according to a modification.
Figure 15:
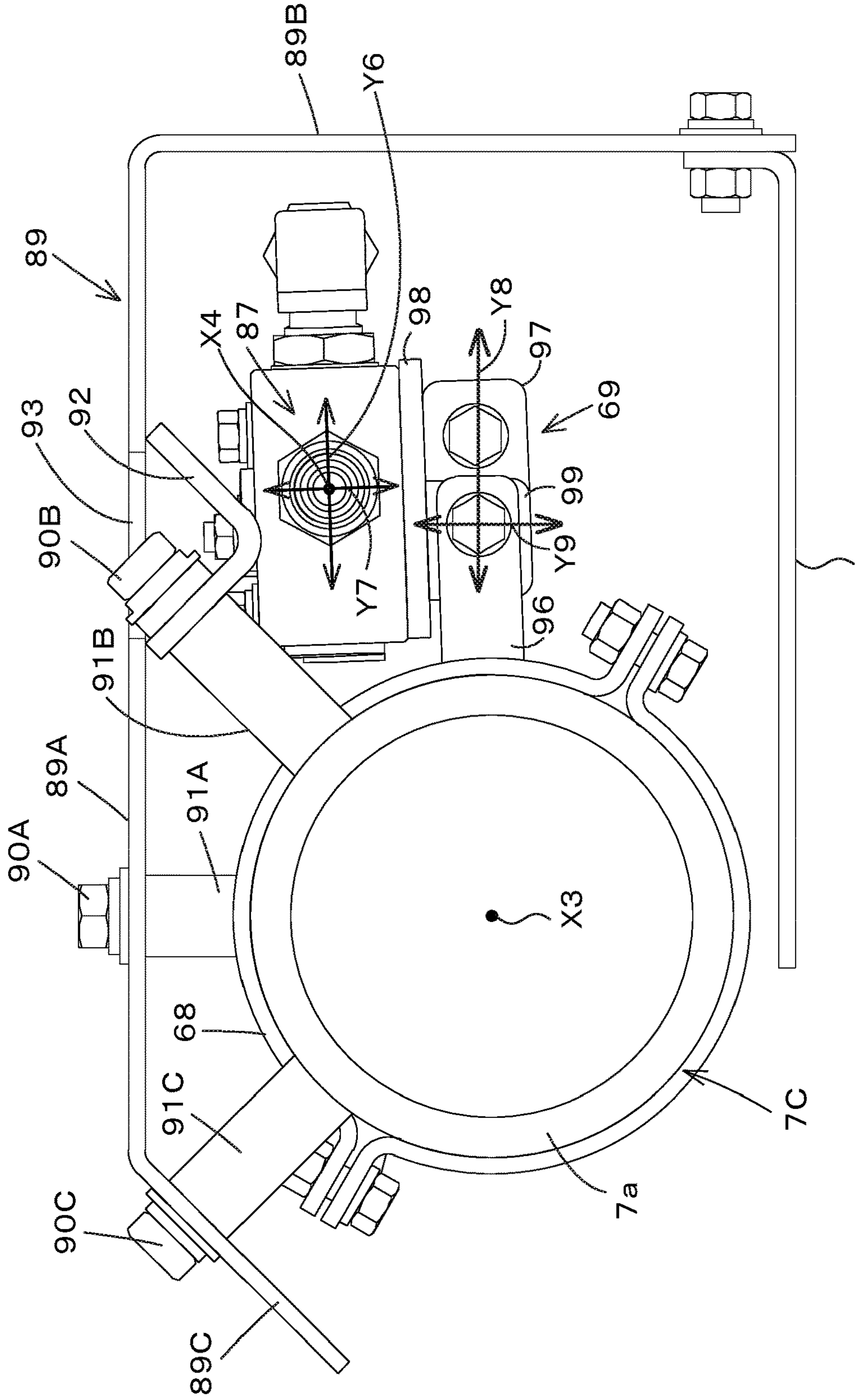
FIG. 15 is a front partial sectional view illustrating a state in which the cover member is mounted on the hydraulic cylinder.
Figure 16:
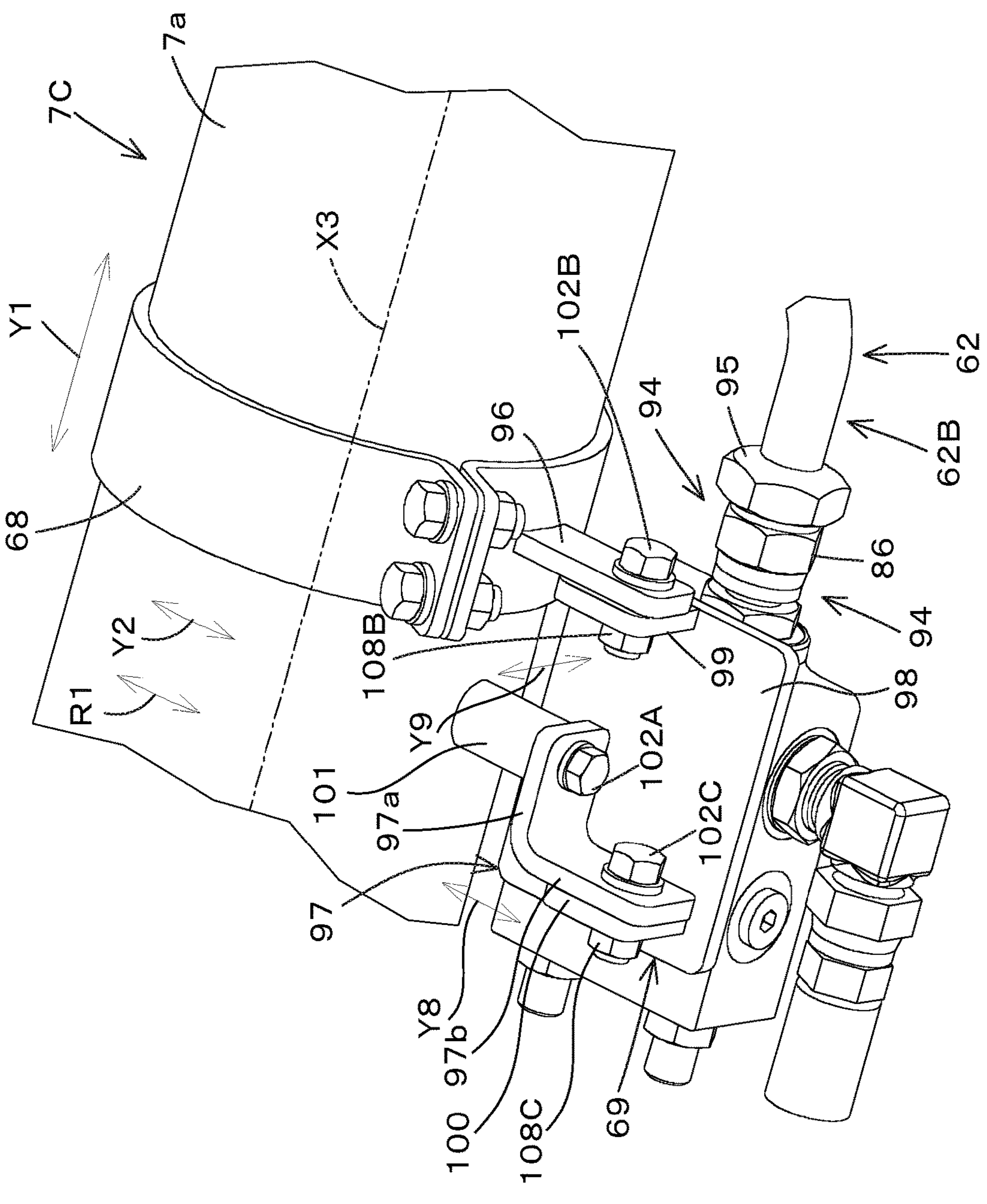
FIG. 16 is a partial enlarged perspective view of an adjustment mechanism according to a modification.

FIGS. 14, 15, and 16 illustrate an embodiment according to a modification of the adjustment mechanism 67.

FIG. 14 is a bottom perspective view of the dozer cylinder 7C and the hold valve device 61. FIG. 15 is a front partial sectional view of the dozer cylinder 7C and the hold valve device 61 in a state in which the cover member 89 is mounted. FIG. 16 is an enlarged view illustrating a state in which the lower side of the hold valve device 61 faces upward. Accordingly, the upward direction in FIG. 16 corresponds to the downward direction from the hold valve device 61. The modification illustrated in FIGS. 14 to 16 differs from the embodiment described above in that the adjustment mechanism 67 does not have the connection structure 67B although having the attachment structure 67A and in that the configuration of the attachment structure 67A differs from that in the embodiment.

As illustrated in FIGS. 14 and 16, the cylinder port 66 of the hold valve 64 is connected to the first cylinder pipe 62 via a pipe fitting (connection structure) 94 having a linear shape. The first cylinder pipe 62 includes a base part pipe 62C and a connection pipe 62B. The base part pipe 62C is an elbow pipe. The connection pipe 62B includes a connection portion 95A that is connected to the elbow pipe, a first joint portion 95B that is fastened to the second joint portion 86 of the pipe fitting 94, and a pipe portion 95C between the connection portion 95A and the first joint portion 95B. The pipe portion 95C is formed so that the axis thereof on the elbow pipe side and the axis thereof on the second joint portion 86 side are offset parallelly.

The attachment structure 67A includes the clamp member 68 that is attached to the cylinder tube 7*a* and the attachment body 69 to which the hold valve 64 is attached.

As illustrated in FIG. 16, the clamp member 68 is configured in the same way as that of the embodiment described above. Accordingly, the position of the hold valve 64 is adjustable in the first direction Y1 by sliding the clamp member 68 in the axial direction of the cylinder tube 7*a*, and the position of the hold valve 64 is adjustable in the second direction Y2 by rotating the clamp member 68 in the circumferential direction R1 of the cylinder tube 7*a*.

As illustrated in FIG. 16, the attachment body 69 includes a first bracket 96, a second bracket 97, a plate member 98, a first attachment piece 99, and a second attachment piece 100. The first bracket 96 is welded to the clamp member 68. The second bracket 97 is attached to a cylinder boss 101, which is welded to the cylinder tube 7*a*, by using a bolt (first bolt) 102A. To be specific, the second bracket 97 is formed by bending a plate material into an L-shape, and includes a first attachment portion 97*a* and a second attachment portion 97*b* that is perpendicular to the first attachment portion 97*a*. The first attachment portion 97*a* is attached to the cylinder boss 101.

As illustrated in FIG. 15, the plate member 98 is disposed on the lower side of the hold valve 64. The hold valve 64 is attached to the plate member 98 by using a bolt that extends through the valve body 64A and that is screwed into a screw hole formed in the plate member 98.

As illustrated in FIG. 16, the first attachment piece 99 and the second attachment piece 100 are fixed to a surface (lower surface) of the plate member 98 opposite to the hold valve 64. The first attachment piece 99 is superposed on the first bracket 96 and attached to the first bracket 96 by using a bolt (second bolt) 102B and a nut 108B. The second attachment piece 100 is superposed on the second attachment portion 97*b* of the second bracket 97 and attached to the second attachment portion 97*b* by using a bolt (third bolt) 102C and a nut 108C.

As illustrated in FIGS. 15 and 16, the first attachment piece 99 is attached to the first bracket 96 so that the position of the first attachment piece 99 is adjustable in two directions (one direction Y6, the other direction Y7) that are perpendicular to the axis X4 of the pipe fastening portion 87 and that are perpendicular to each other. To be specific, the first bracket 96 has a bolt insertion hole through which a second bolt 102B is inserted and that is an elongated hole that is elongated in an eighth direction Y8 parallel to the one direction Y6; the first attachment piece 99 has a bolt insertion hole through which a second bolt 102B is inserted and that is an elongated hole that is elongated in a ninth direction Y9 parallel to the other direction; and the position of the first attachment piece 99 is adjustable in the eighth direction Y8 and the ninth direction Y9.

The second attachment piece 100 is attached to the second bracket 97 so that the position of the second attachment piece 100 is adjustable in a direction parallel to the one direction Y6. To be specific, the second attachment portion 97*b* of the second bracket 97 has a bolt insertion hole through which a third bolt 102C is inserted and that is an elongated hole that is elongated in the eighth direction, and, thus, the position of the second attachment piece 100 is adjustable in the eighth direction.

The second bracket 97 is attached to the cylinder boss 101 so that the position of the second bracket 97 is adjustable in a direction parallel to the other direction Y7. To be specific, the first attachment portion 97*a* of the second bracket 97 has a bolt insertion hole through which a first bolt 102A is inserted and that is an elongated hole that is elongated in the ninth direction Y9, and, thus, the position of the second bracket 97 is adjustable in the ninth direction Y9.

With the adjustment mechanism 67 according to the modification described above, it is possible to suppress occurrence of strain on the pipe fastening portion 87 and to reduce the risk of fluid leakage by adjusting the position of the clamp member 68 in the first direction Y1 and the second direction Y2 and by adjusting the position of the attachment body 69 in the eighth direction Y8 and the ninth direction Y9.

As illustrated in FIG. 15, the cover member 89 according to the embodiment illustrated in FIGS. 14 to 16 includes: the upper wall portion 89A; the first side-wall portion 89B, which extends from an end part (left end part) of the upper wall portion 89A in the downward direction perpendicular to the upper wall portion 89A; the second side-wall portion 89C, which extends from the other end part (right end part) of the upper wall portion 89A in an inclination direction such that the second side-wall portion 89C shifts rightward in the downward direction; and the lower plate 89D, which extends from the first side-wall portion 89B toward the cylinder tube 7*a*. Members and portions that are the same as those of the embodiment described above will be denoted by the same reference numerals, and descriptions of such members and portions will be omitted.

Figure 17:
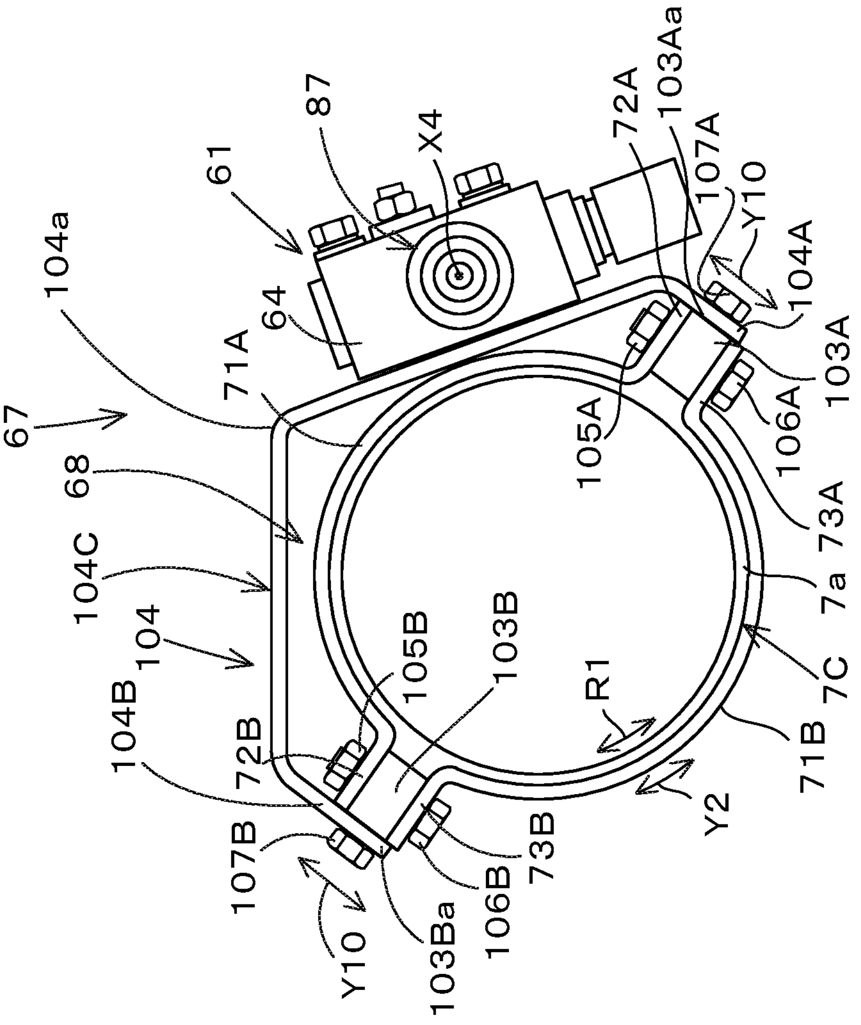
FIG. 17 is a front view of an adjustment mechanism according to another modification.

FIG. 17 illustrates an adjustment mechanism 67 according to another modification.

As illustrated in FIG. 17, the adjustment mechanism 67 according to the other modification includes the clamp member 68, a pair of block members 103A and 103B that are attached to the clamp member 68, a holding frame (holding member) 104 that is attached to one of the block members (a first block member 103A) and the other block member (a second block member 103B) and to which the hold valve 64 is attached.

The clamp member 68 is configured in the same way as that of the embodiment described above. Accordingly, the position of the hold valve 64 is adjustable in the first direction Y1 by moving the clamp member 68 in a direction along the axial direction of the cylinder tube 7*a* (see FIG. 4), and the position of the hold valve 64 is adjustable in the second direction Y2 by rotating the clamp member 68 in the circumferential direction R1 of the cylinder tube 7*a*.

The first block member 103A is attached by being interposed between the fixing piece 72A at a first end part of the first component 68A and the fixing piece 73A at a first end part of the second component 68B. To be specific, the first block member 103A has a rectangular block-like shape, is disposed between the fixing piece 72A and the fixing piece 73A, and is attached by using a bolt 106A that extends through the fixing pieces 72A and 73A and the first block member 103A and that is screwed into a nut 105A fixed to the fixing piece 72A.

The second block member 103B is attached by being interposed between the fixing piece 72B at a second end part of the first component 68A and the fixing piece 73B at a second end part of the second component 68B. To be specific, the second block member 103B has a rectangular block-like shape, is disposed between the fixing piece 72B and the fixing piece 73B, and is attached by using a bolt 106B that extends through the fixing pieces 72B and 73B and the second block member 103B and that is screwed into a nut 105B fixed to the fixing piece 72B.

The holding frame 104 is formed by bending a strip material and includes a first section 104A, a second section 104B, and a third section 104C.

The first section 104A is superposed on a surface (an attachment surface 103Aa) of the first block member 103A opposite to the cylinder tube 7*a* and is attached by using a first bolt 107A. A bolt insertion hole through which the first bolt 107A is inserted is an elongated hole that is elongated in a direction (tenth direction Y10) that is along the attachment surface 103Aa of the first block member 103A and that is parallel to a direction perpendicular to the axis X4 of the pipe fastening portion 87.

The second section 104B is superposed on a surface (an attachment surface 103Ba) of the second block member 103B opposite to the cylinder tube 7*a* and is attached by using a second bolt 107B. A bolt insertion hole through which the second bolt 107B is inserted is an elongated hole that is elongated in a direction (tenth direction Y10) that is along the attachment surface 103Ba of the second block member 103B and that is parallel to the direction perpendicular to the axis X4 of the pipe fastening portion 87.

The third section 104C couples the first section 104A and the second section 104B. The third section 104C is bent in a V-shape at a bent portion 104*a* in an intermediate part thereof. The hold valve 64 is fixed, by using a bolt, to a part of the holding frame 104 between the bent portion 104*a* of the third section 104C and the first section 104A.

With the adjustment mechanism 67 according to the modification described above, it is possible to suppress occurrence of strain on the pipe fastening portion 87 and to reduce the risk of fluid leakage by adjusting the position of the clamp member 68 in the first direction Y1 and the second direction Y2 and by adjusting the position of the holding frame 104 in the tenth direction Y10.

The valve mounting mechanism described above, for mounting a mount valve (the hold valve 64) on the cylinder tube 7*a* of a hydraulic cylinder (the dozer cylinder 7C), includes: the attachment structure 67A that attaches the mount valve 64 to the hydraulic cylinder 7C; the connection structure 67B that connects a second end part of the hydraulic pipe 62, whose first end part is connected to the hydraulic cylinder 7C, to the cylinder port 66 of the mount valve 64; and the adjustment mechanism 67 that adjusts relative positions of the pipe fastening portion 87, where the hydraulic pipe 62 is fastened to the connection structure 67B, and the mount valve 64.

With this configuration, it is possible to suppress strain on the pipe fastening portion 87 and to reduce the risk of fluid leakage by adjusting the positions of the pipe fastening portion 87 and the mount valve 64.

The connection structure 67B includes, as the adjustment mechanism 67, the first pipe fitting 83 whose first end part is rotatably fastened to the hydraulic pipe 62, the second pipe fitting 84 that is disposed at a position where the axial direction of the second pipe fitting 84 is parallel to the axial direction of the first pipe fitting 83 and where the second pipe fitting 84 is offset from the first pipe fitting 83 in a direction perpendicular to the axial directions and that has a first end part connected to the cylinder port 66, and the intermediate-connection member to which a second end part of the first pipe fitting 83 and a second end part of the second pipe fitting 84 are connected.

With this configuration, it is possible to adjust the position of the mount valve 64 by rotating the first pipe fitting 83 around the axis thereof.

The attachment structure includes, as the adjustment mechanism 67, the clamp member 68 that is attached to the cylinder tube 7*a* of the hydraulic cylinder 7C so that the position of the clamp member 68 is adjustable in the circumferential direction R1, the attachment base 76 that is fixed to the clamp member 68, and the attachment plate 77 to which the mount valve 64 is to be attached. The axis X4 of the first pipe fitting 83 and the axis X5 of the second pipe fitting 84 extend in a direction parallel to the axis X3 of the cylinder tube 7*a*. The attachment base 76 has the attachment surface 76*a* to which the attachment plate 77 is attached so that the position of the attachment plate 77 is adjustable in an adjustment direction (the third direction Y3) parallel to a direction perpendicular to the axial direction of the first pipe fitting 83.

With this configuration, it is possible to adjust the position of the mount valve 64 by rotating the clamp member 68 in the circumferential direction R1 of the cylinder tube 7*a* and by adjusting the position of the attachment plate 77 in the adjustment direction Y3.

The attachment surface 76*a* the attachment surface may be a surface that is orthogonal to a direction perpendicular to the axis X3 of the cylinder tube 7*a*, and the position of the attachment plate 77 may be adjustable along the attachment surface 76*a* in the adjustment direction.

The attachment structure includes, as the adjustment mechanism 67, the clamp member 68 that is attached to the cylinder tube 7*a* of the hydraulic cylinder 7C so that the position of the clamp member 68 is adjustable in the circumferential direction, the first bracket 96 that is fixed to the clamp member 68, the second bracket 97 that is attached to the cylinder boss 101 that is fixed to the cylinder tube 7*a*, and the attachment body 69 that is supported by the first bracket 96 and the second bracket 97 so that the position of the attachment body 69 is adjustable in a direction parallel to a direction perpendicular to the axis X4 of the pipe fastening portion 87 and to which the mount valve 64 is to be attached.

With this configuration, it is possible to adjust the position of the mount valve 64 by rotating the clamp member 68 in the circumferential direction R1 of the cylinder tube 7*a* and by adjusting the position of the attachment body 69.

The attachment body 69 includes the plate member 98 to which the mount valve 64 is to be attached, and the first attachment piece 99 and the second attachment piece 100 that are fixed to the plate member 98. The first attachment piece 99 is attached to the first bracket 96 so that the position of the first attachment piece 99 is adjustable in two directions parallel to two directions that are perpendicular to the axis of the pipe fastening portion 87 and that are perpendicular to each other. The second attachment piece 100 is attached to the second bracket 97 so that the position of the second attachment piece 100 is adjustable in one direction Y6 of the two directions. The second bracket 97 is attached to the cylinder boss 101 so that the position of the second bracket 97 is adjustable in the other direction Y7 of the two directions.

With this configuration, it is possible to adjust the position of the hold valve 64 by adjusting the position of the attachment body 69 in a direction parallel to one direction Y6 and in a direction parallel to the other direction Y7.

The attachment structure includes, as the adjustment mechanism 67, the clamp member 68 that is attached to the cylinder tube 7*a* of the hydraulic cylinder 7C so that the position of the clamp member 68 is adjustable in the circumferential direction, the pair of block members (one block members 103A, the other block member 103B) that are attached to the clamp member 68, and the holding member (the holding frame 104) that holds the mount valve 64. The clamp member 68 includes the pair of components (the first component 68A, the second component 68B) that are attached with the cylinder tube 7*a* interposed therebetween. The block member 103A is attached so as to be interposed between first end parts of the pair of components 68A and 68B. The block member 103B is attached so as to be interposed between second end parts of the pair of components 68A and 68B. The holding member 104 is provided so as to extend from the block member 103A to the block member 103B and is attached to the pair of block members 103A and 103B so that the position of the holding member 104 is adjustable in a direction parallel to a direction perpendicular to the axial direction of the pipe fastening portion 87.

With this configuration, it is possible to adjust the position of the mount valve 64 by rotating the clamp member 68 in the circumferential direction R1 of the cylinder tube 7*a* and by adjusting the position of the holding member 104 with respect to the block members 103A and 103B.

The mount valve 64 is a hold valve that switches between a state in which the hold valve allows passing of a hydraulic fluid discharged from the hydraulic pipe 62 and a state in which the hold valve prohibits passing of a hydraulic fluid discharged from the hydraulic pipe 62.

With this configuration, it is possible to suppress occurrence of strain on the pipe fastening portion 87 where the hydraulic pipe 62 connected to the hydraulic cylinder 7C is fastened to the cylinder port 66 of the hold valve 64.

The hydraulic device includes the hydraulic cylinder 7C and the mount valve 64 that is mounted on the cylinder tube 7*a* of the hydraulic cylinder 7C by using the valve mounting mechanism.

With this configuration, it is possible to provide the hydraulic device that can suppress occurrence of strain on the pipe fastening portion 87 where the hydraulic pipe 62 connected to the hydraulic cylinder 7C is fastened to the cylinder port 66 of the mount valve 64.

The working machine 1 includes the hydraulic device.

With this configuration, it is possible to provide the working machine 1 that can suppress occurrence of strain on the pipe fastening portion 87 where the hydraulic pipe 62 connected to the hydraulic cylinder 7C is fastened to the cylinder port 66 of the mount valve 64.

Heretofore, an embodiment of the present invention has been described. It should be understood that the embodiment disclosed herein is exemplary in all respects and does not limit the present invention. The scope of the present invention is described not in the above description but in the claims, and it is intended that all modifications within the equivalents of the claims are included in the scope.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A valve mounting mechanism for mounting a mount valve on a cylinder tube of a hydraulic cylinder, the valve mounting mechanism comprising:
- an attachment structure that attaches the mount valve to the hydraulic cylinder;
- a connection structure that connects a second end part of a hydraulic pipe, whose first end part is connected to the hydraulic cylinder, to a cylinder port of the mount valve; and
- an adjustment mechanism that adjusts relative positions of a pipe fastening portion, where the hydraulic pipe is fastened to the connection structure, and the mount valve,
- wherein the connection structure includes, as the adjustment mechanism,
  - a first pipe fitting whose first end part is rotatably fastened to the hydraulic pipe,
  - a second pipe fitting that is disposed at a position where an axial direction of the second pipe fitting is parallel to an axial direction of the first pipe fitting and where the second pipe fitting is offset from the first pipe fitting in a direction perpendicular to the axial directions and that has a first end part connected to the cylinder port, and
  - an intermediate-connection member to which a second end part of the first pipe fitting and a second end part of the second pipe fitting are connected,
- wherein the attachment structure includes, as the adjustment mechanism,
  - a clamp member that is attached to the cylinder tube of the hydraulic cylinder so that a position of the clamp member is adjustable in a circumferential direction,
  - an attachment base that is fixed to the clamp member, and
  - an attachment plate to which the mount valve is to be attached,
- wherein an axis of the first pipe fitting and an axis of the second pipe fitting extend in a direction parallel to an axis of the cylinder tube, and
- wherein the attachment base has an attachment surface to which the attachment plate is attached so that a position of the attachment plate is adjustable in an adjustment direction parallel to a direction perpendicular to an axial direction of the first pipe fitting.

2. The valve mounting mechanism according to claim 1,
- wherein the attachment surface is a surface that is orthogonal to a direction perpendicular to the axis of the cylinder tube, and
- wherein the position of the attachment plate is adjustable along the attachment surface in the adjustment direction.

3. The valve mounting mechanism according to claim 1, wherein the mount valve is a hold valve that switches between a state in which the hold valve allows passing of a hydraulic fluid discharged from the hydraulic pipe and a state in which the hold valve prohibits passing of a hydraulic fluid discharged from the hydraulic pipe.

4. A hydraulic device comprising a hydraulic cylinder and a mount valve that is mounted on a cylinder tube of the hydraulic cylinder by using the valve mounting mechanism according to claim 1.

5. A working machine comprising the hydraulic device according to claim 4.

6. A valve mounting mechanism for mounting a mount valve on a cylinder tube of a hydraulic cylinder, the valve mounting mechanism comprising:

an attachment structure that attaches the mount valve to the hydraulic cylinder;

a connection structure that connects a second end part of a hydraulic pipe, whose first end part is connected to the hydraulic cylinder, to a cylinder port of the mount valve; and an adjustment mechanism that adjusts relative positions of a pipe fastening portion, where the hydraulic pipe is fastened to the connection structure, and the mount valve, wherein the attachment structure includes, as the adjustment mechanism, a clamp member that is attached to the cylinder tube of the hydraulic cylinder so that a position of the clamp member is adjustable in a circumferential direction, a first bracket that is fixed to the clamp member, a second bracket that is attached to a cylinder boss that is fixed to the cylinder tube, and an attachment body that is supported by the first bracket and the second bracket so that a position of the attachment body is adjustable in a direction parallel to a direction perpendicular to an axis of the pipe fastening portion and to which the mount valve is to be attached.

7. The valve mounting mechanism according to claim 6, wherein the attachment body includes a plate member to which the mount valve is to be attached, and a first attachment piece and a second attachment piece that are fixed to the plate member, wherein the first attachment piece is attached to the first bracket so that a position of the first attachment piece is adjustable in two directions parallel to two directions that are perpendicular to the axis of the pipe fastening portion and that are perpendicular to each other, wherein the second attachment piece is attached to the second bracket so that a position of the second attachment piece is adjustable in one direction of the two directions, and wherein the second bracket is attached to the cylinder boss so that a position of the second bracket is adjustable in the other direction of the two directions.

8. A valve mounting mechanism for mounting a mount valve on a cylinder tube of a hydraulic cylinder, the valve mounting mechanism comprising:

an attachment structure that attaches the mount valve to the hydraulic cylinder;

a connection structure that connects a second end part of a hydraulic pipe, whose first end part is connected to the hydraulic cylinder, to a cylinder port of the mount valve; and an adjustment mechanism that adjusts relative positions of a pipe fastening portion, where the hydraulic pipe is fastened to the connection structure, and the mount valve, wherein the attachment structure includes, as the adjustment mechanism, a clamp member that is attached to the cylinder tube of the hydraulic cylinder so that a position of the clamp member is adjustable in a circumferential direction, a pair of block members that are attached to the clamp member, and a holding member that holds the mount valve, wherein the clamp member includes a pair of components that are attached with the cylinder tube interposed therebetween, wherein one of the block members is attached so as to be interposed between first end parts of the pair of components, wherein the other block member is attached so as to be interposed between second end parts of the pair of components, and wherein the holding member is provided so as to extend from the one of the block members to the other block member and is attached to the pair of block members so that a position of the holding member is adjustable in a direction parallel to a direction perpendicular to an axial direction of the pipe fastening portion.

* * * * *